United States Patent
Sun et al.

(10) Patent No.: US 10,165,565 B2
(45) Date of Patent: Dec. 25, 2018

(54) LEGACY AND NEW RADIO COEXISTENCE FRAME AND CONTROL DESIGN

(71) Applicant: QUALCOMM Incorporated, San Diego, CA (US)

(72) Inventors: Haitong Sun, Cupertino, CA (US); Wanshi Chen, San Diego, CA (US); Yeliz Tokgoz, San Diego, CA (US); Peter Gaal, San Diego, CA (US); Heechoon Lee, San Diego, CA (US); Jing Sun, San Diego, CA (US); Joseph Binamira Soriaga, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/798,300

(22) Filed: Oct. 30, 2017

(65) Prior Publication Data
US 2018/0279303 A1    Sep. 27, 2018

Related U.S. Application Data

(60) Provisional application No. 62/476,503, filed on Mar. 24, 2017.

(51) Int. Cl.
*H04W 72/04* (2009.01)
*H04W 72/12* (2009.01)
*H04L 5/14* (2006.01)

(52) U.S. Cl.
CPC ....... *H04W 72/0446* (2013.01); *H04W 72/12* (2013.01); *H04L 5/14* (2013.01)

(58) Field of Classification Search
CPC ................................................ H04W 72/0446
See application file for complete search history.

(56) References Cited

U.S. PATENT DOCUMENTS 8,861,549 B2 * 10/2014 Koorapaty .......... H04L 27/2601
370/470
9,161,288 B2 * 10/2015 Cho ...................... H04W 88/04
(Continued)

OTHER PUBLICATIONS

Huawei, et al., "Coexistence of NR DL and LTE", 3GPP Draft; R1-1701667, 3rd Generation Partnership Project (3GPP), Mobile Competence Centre; 650, Route Des Lucioles; F-06921 Sophia-Antipolis Cedex; France, vol. RAN WG1, no. Athens, Greece; Feb. 13, 2017-Feb. 17, 2017, Feb. 12, 2017, XP051208834, 6 pages, Retrieved from the Internet: URL: http://www.3gpp.org/ftp/Meetings_3GPP_SYNC/RAN1/Docs/ [retrieved on Feb. 12, 2017].
(Continued)

*Primary Examiner* — Raj Jain
*Assistant Examiner* — Andrew C Lee
(74) *Attorney, Agent, or Firm* — Loza & Loza, LLP

(57) ABSTRACT

Aspects of the disclosure relate to next generation (e.g., fifth generation or 5G) cells that support legacy radio access technologies by sharing a carrier between 5G and legacy transmissions. To facilitate coexistence between legacy and 5G transmissions, a configurable slot structure may be utilized for 5G transmissions. The configurable slot structure may be configured to have an effective duration that prevents transmission thereof during at least a portion of a control region of a legacy subframe. Other aspects, embodiments, and features are also claimed and described.

30 Claims, 19 Drawing Sheets

(56) References Cited

U.S. PATENT DOCUMENTS

| | | | | |
|---|---|---|---|---|
| 2007/0086370 | A1* | 4/2007 | Jang | H04L 1/0025 370/318 |
| 2010/0135272 | A1* | 6/2010 | Dayal | H04W 88/10 370/343 |
| 2011/0194523 | A1* | 8/2011 | Chung | H04L 5/0007 370/329 |
| 2012/0033589 | A1* | 2/2012 | Zheng | H04W 99/00 370/280 |
| 2013/0077718 | A1* | 3/2013 | Chavali | H04L 5/0007 375/340 |
| 2013/0208587 | A1* | 8/2013 | Bala | H04W 16/14 370/230 |
| 2014/0086116 | A1* | 3/2014 | Seo | H04W 72/14 370/280 |
| 2014/0112254 | A1* | 4/2014 | Lindoff | H04W 74/002 370/328 |
| 2014/0213261 | A1* | 7/2014 | Das | H04W 36/0083 455/437 |
| 2014/0376486 | A1* | 12/2014 | Lee | H04W 74/0833 370/329 |
| 2015/0016312 | A1* | 1/2015 | Li | H04W 74/0833 370/280 |
| 2015/0334642 | A1* | 11/2015 | Maaref | H04W 48/18 370/329 |
| 2016/0119099 | A1* | 4/2016 | Kim | H04L 5/0048 370/329 |
| 2016/0198508 | A1* | 7/2016 | Lee | H04W 72/02 370/329 |
| 2016/0338077 | A1* | 11/2016 | Chin | H04W 72/1215 |
| 2017/0156154 | A1* | 6/2017 | Deparis | H04W 72/1215 |
| 2017/0201968 | A1* | 7/2017 | Nam | H04W 72/042 |
| 2017/0280479 | A1* | 9/2017 | Frenne | H04W 16/14 |
| 2017/0290089 | A1* | 10/2017 | Kato | H04W 88/06 |
| 2017/0295589 | A1* | 10/2017 | Sundararajan | H04L 5/14 |

OTHER PUBLICATIONS

International Search Report and Written Opinion—PCT/US2018/022711—ISA/EPO—Jun. 8, 2018.

NTT Docomo, et al., "Summary of [87-36]: Mini-slot designs for NR", 3GPP Draft; R1-1700617, 3rd Generation Partnership Project (3GPP), Mobile Competence Centre; 650, Route Des Lucioles; F-06921 Sophia-Antipolis Cedex; France, vol. RAN WG1, no. Spokane, USA; Jan. 16, 2017-Jan. 20, 2017, Jan. 17, 2017 (Jan. 1, 2017), XP051222222, Retrieved from the Internet: URL: http://www.3gpp.org/ftp/tsg_ran/WG1_RL1/TSGR1_AH/NR_AH_1701/Docs/ [retrieved on Jan. 17, 2017].

QUALCOMM Incorporated: "NR LTE Coexistence Considerations," 3GPP Draft; R1-1702651 NR-LTE Coexistence Considerations, 3rd Generation Partnership Project (3GPP), Mobile Competence Centre; 650, Route Des Lucioles; F-06921, Sophia-Antipolis Cedex; France, vol. RAN WG1, no. Athens, Greece; Feb. 13, 2017-Feb. 17, 2017, Feb. 12, 2017, XP051209800, 4 pages, Retrieved from the Internet: URL: http://www.3gpp.org/ftp/Meetings_3GPP_SYNC/RAN1/Docs/ [retrieved on Feb. 12, 2017].

Samsung: "LTE-NR Co-existence," 3GPP Draft; R2-1701593_NR Co-Existence, 3rd Generation Partnership Project (3GPP), Mobile Competence Centre; 650, Route Des Lucioles; F-06921 Sophia-Antipolis Cedex; France, vol. RAN WG2, no. Athens, Greece; Feb. 13, 2017-Feb. 17, 2017, Feb. 12, 2017, XP051212197, 5 pages, Retrieved from the Internet: URL: http://www.3gpp.org/ftp/Meetings_3GPP_SYNC/RAN2/Docs/ [retrieved on Feb. 12, 2017].

Samsung: "LTE-NR Coexistence for DL", 3GPP Draft; R1-1703010 LTE-NR Coexistence for DL_FINAL, 3rd Generation Partnership Project (3GPP), Mobile Competence Centre; 650, Route Des Lucioles; F-06921, Sophia-Antipolis Cedex; France, vol. RAN WG1, no. Athens, Greece; Feb. 13, 2017-Feb. 17, 2017, Feb. 12, 2017, XP051210151, 4 pages, Retrieved from the Internet: URL: http://www.3gpp.org/ftp/Meetings_3GPP_SYNC/RAN1/Docs/ [retrieved on Feb. 12, 2017].

* cited by examiner

DL-Centric Slot

UL-Centric Slot

_US 10,165,565 B2_

LEGACY AND NEW RADIO COEXISTENCE FRAME AND CONTROL DESIGN

PRIORITY CLAIM

This application claims priority to and the benefit of Provisional Patent Application No. 62/476,503 filed in the U.S. Patent and Trademark Office on Mar. 24, 2017, the entire content of which is incorporated herein by reference as if fully set forth below in its entirety and for all applicable purposes.

TECHNICAL FIELD

The technology discussed below relates generally to wireless communication networks, and more particularly, to coexistence between legacy and fifth generation (5G) wireless communication networks. Embodiments can enable techniques for sharing the same carrier in wireless networks that support legacy and 5G radio access technologies.

INTRODUCTION

Next generation wireless communication networks (e.g., fifth generation or 5G), also referred to herein as New Radio (NR) wireless communication networks, may support both the NR radio access technology (RAT) and legacy (e.g., fourth generation or 4G) radio access technologies. An example of a legacy RAT includes the Long Term Evolution (LTE) RAT. Recently, it has been proposed to share the same downlink carrier for NR transmissions and LTE multi-broadcast single-frequency network (MBSFN) transmissions.

MBSFN is a communication channel that delivers services such as mobile TV to user equipment (UE). The base station or multiple base stations may transmit the same identical data (e.g., mobile TV) to multiple UEs within the network. For frequency division duplexed (FDD) networks, MBSFN data may be transmitted within subframes 1, 2, 3, 6, and 7 of an LTE radio frame, whereas for time division duplexed (TDD) networks, MBSFN data may be transmitted within subframes 3, 4, 7, 8, and 9 of an LTE radio frame. Each MBSFN subframe contains a control region and a traffic region. Typically, the control region includes one or two physical downlink control channel (PDCCH) symbols that include LTE control information and a cell specific reference signal (CRS).

As the demand for mobile broadband access continues to increase, research and development continue to advance wireless communication technologies not only to meet the growing demand for mobile broadband access, but also to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to mechanisms for next generation (e.g., 5G or New Radio) cells to support legacy radio access technologies by sharing a carrier between New Radio (NR) and legacy transmissions. To facilitate coexistence between legacy and NR transmissions, a configurable slot structure may be utilized for NR transmissions. The configurable slot structure may be configured to produce a NR slot that has an effective duration that prevents transmission thereof during at least a portion of a control region of a legacy subframe. In some examples, the legacy subframe may be a multicast-broadcast single-frequency network (MBSFN) subframe.

In some aspects of the present disclosure, the configurable slot structure may further be configured to either align the radio frame timing between the NR slot and legacy subframe or offset the radio frame timing between the NR slot and the legacy subframe. When the NR slot and legacy subframe are aligned, the NR slot may begin transmission of control information after transmission of the control region of the legacy subframe. As such, the effective duration of the NR slot begins upon transmission of the control information and continues through the end of the slot. When the NR slot and legacy subframe are offset, the NR slot may be configured to begin after transmission of the control region of the legacy subframe or prior to transmission of the control region of the legacy subframe. Thus, the radio frame timing between the NR slot and the legacy subframe may be offset such that the NR frame timing is earlier or later than the legacy radio frame timing.

In some aspects of the present disclosure, the NR slot may be transmitted when a traffic region of the legacy subframe is empty. In other aspects of the present disclosure, the carrier bandwidth may be divided into a NR bandwidth for transmitting the NR slot and a legacy bandwidth for transmitting the traffic region of the legacy subframe. The control region of the legacy subframe may still be transmitted utilizing the entire carrier bandwidth.

In one aspect of the disclosure, a method for a scheduling entity to communicate with a set of one or more scheduled entities in a serving cell of a wireless communication network utilizing a first radio access technology is provided. The method includes identifying a subframe structure of a current subframe for a second radio access technology supported by the serving cell that is different than the first radio access technology, where the subframe structure of the current subframe comprises a control region and a traffic region. The method further includes selecting an effective duration of a configurable slot structure for the first radio access technology to produce a current slot based on the subframe structure of the current subframe, where the effective duration of the current slot is selected to prevent transmission thereof during at least a portion of the control region of the current subframe. The method further includes communicating between the scheduling entity and the set of one or more scheduled entities using the current slot, where communication of the current slot occurs at least partially within the current subframe and the current slot and the current subframe utilize a same carrier.

Another aspect of the disclosure provides a scheduling entity for communicating with a set of one or more scheduled entities in a serving cell of a wireless communication network utilizing a first radio access technology. The scheduling entity includes a transceiver, a memory, and a processor communicatively coupled to the transceiver and the memory. The processor can be configured as a processor circuit or circuitry capable of executing sets of instructions and comprising internal hardware enabling said execution.

The processor is configured to identify a subframe structure of a current subframe for a second radio access technology supported by the serving cell that is different than the first radio access technology, where the subframe structure of the current subframe comprises a control region and a traffic region. The processor is further configured to select an effective duration of a configurable slot structure for the first radio access technology to produce a current slot based on the subframe structure of the current subframe, where the effective duration of the current slot is selected to prevent transmission thereof during at least a portion of the control region of the current subframe. The processor is further configured to communicate with the set of one or more scheduled entities using the current slot, where communication of the current slot occurs at least partially within the current subframe and the current slot and the current subframe utilize a same carrier.

Another aspect of the disclosure provides a scheduling entity for communicating with a set of one or more scheduled entities in a serving cell of a wireless communication network utilizing a first radio access technology. The scheduling entity includes means for identifying a subframe structure of a current subframe for a second radio access technology supported by the serving cell that is different than the first radio access technology, where the subframe structure of the current subframe comprises a control region and a traffic region. The scheduling entity further includes means for selecting an effective duration of a configurable slot structure for the first radio access technology to produce a current slot based on the subframe structure of the current subframe, where the effective duration of the current slot is selected to prevent transmission thereof during at least a portion of the control region of the current subframe. The scheduling entity further includes means for communicating with the set of one or more scheduled entities using the current slot, where communication of the current slot occurs at least partially within the current subframe and the current slot and the current subframe utilize a same carrier.

Another aspect of the disclosure provides a non-transitory computer-readable medium storing computer executable code. The non-transitory computer-readable medium includes code for providing a configurable slot structure for a serving cell for a first radio access technology, where the serving cell further supports a second radio access technology different than the first radio access technology. The non-transitory computer-readable medium further includes code for identifying a subframe structure of a current subframe for the second radio access technology, where the subframe structure of the current subframe includes a control region and a traffic region. The non-transitory computer-readable medium further includes code for selecting an effective duration of the configurable slot structure to produce a current slot based on the subframe structure of the current subframe, where the effective duration of the current slot is selected to prevent transmission thereof during at least a portion of the control region of the current subframe. The non-transitory computer-readable medium further includes code for communicating between the scheduling entity and a set of one or more scheduled entities using the current slot, where communication of the current slot occurs at least partially within the current subframe and the current slot and the current subframe utilize a same carrier.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
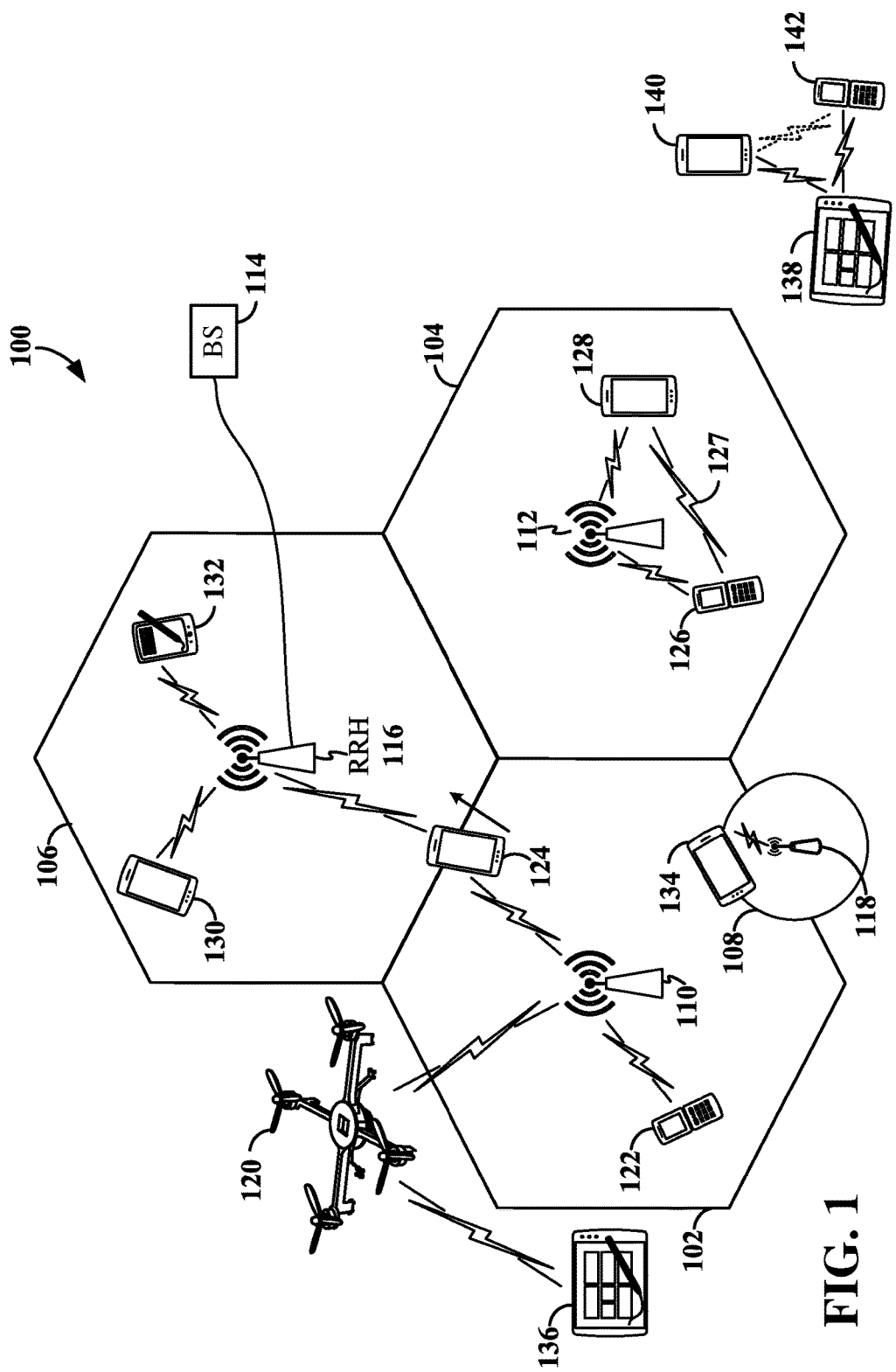
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The radio access network 100 may be a next generation (e.g., fifth generation (5G) or New Radio (NR)) radio access network, a legacy (3G or 4G) radio access network, or a radio access network supporting both NR and legacy wireless communication standards. In addition, one or more nodes in the radio access network 100 may be next generation nodes or legacy nodes.

As used herein, the term legacy radio access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation radio access network generally refers to a network employing continued evolved wireless communication technologies. This may include, for example, a fifth generation (5G) wireless communication technology based on a set of standards (e.g., issued by 3GPP, www.3gpp.org). The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum and Korea Telecom SIG.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, a medical device, implantable devices, industrial equipment, and many other devices sized, shaped, and configured for use by users.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. UEs may comprise a number of hardware structural components sized, shaped, and arranged to help in communication; such components can include antennas, antenna arrays, RF chains, amplifiers, one or more processors, etc. electrically coupled to each other.

In another example, a mobile network node (e.g., quadcopter 120) may be configured to function as a UE. For example, the quadcopter 120 may operate within cell 102 by communicating with base station 110. In some aspects of the present disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, 5G NR specifications provide multiple access for uplink (UL) or reverse link transmissions from UEs 122 and 124 to base station 110, and for multiplexing for downlink (DL) or forward link transmissions from base station 110 to one or more UEs 122 and 124, utilizing orthogonal frequency division multiplexing access (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-1-DMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the radio access network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
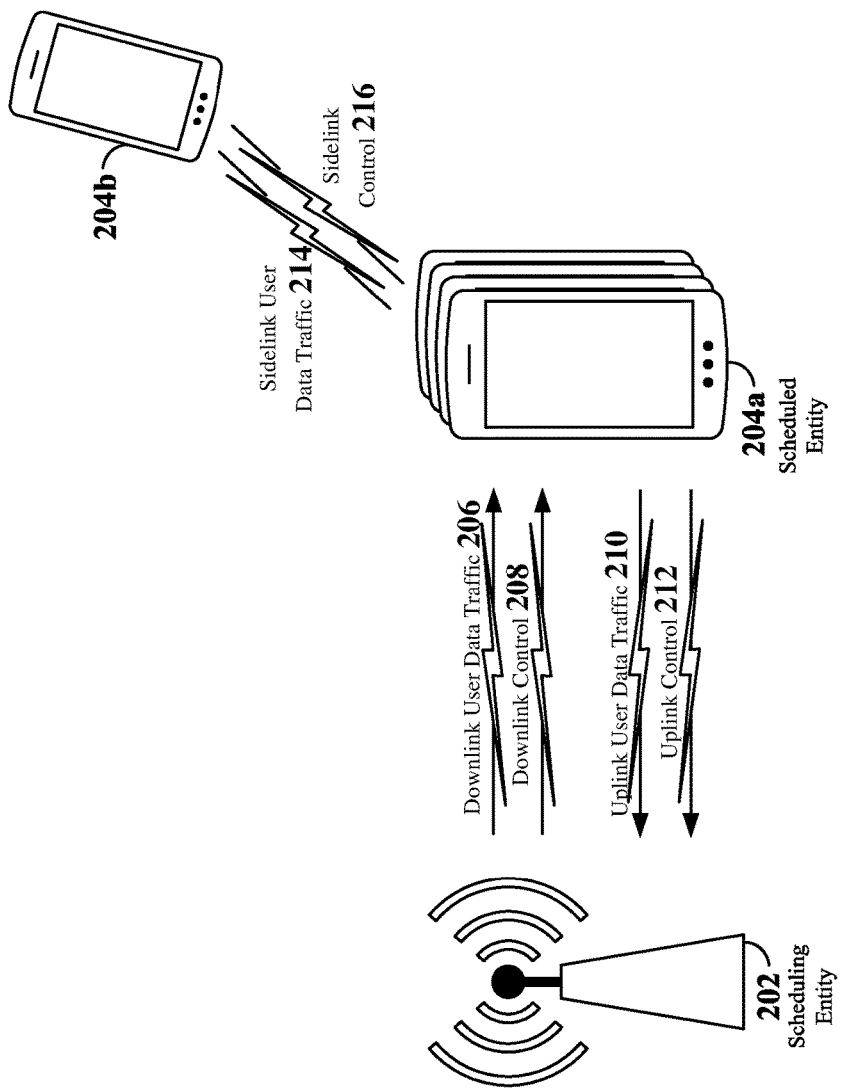
FIG. 2 is a block diagram illustrating an example of a scheduling entity communicating with one or more scheduled entities according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
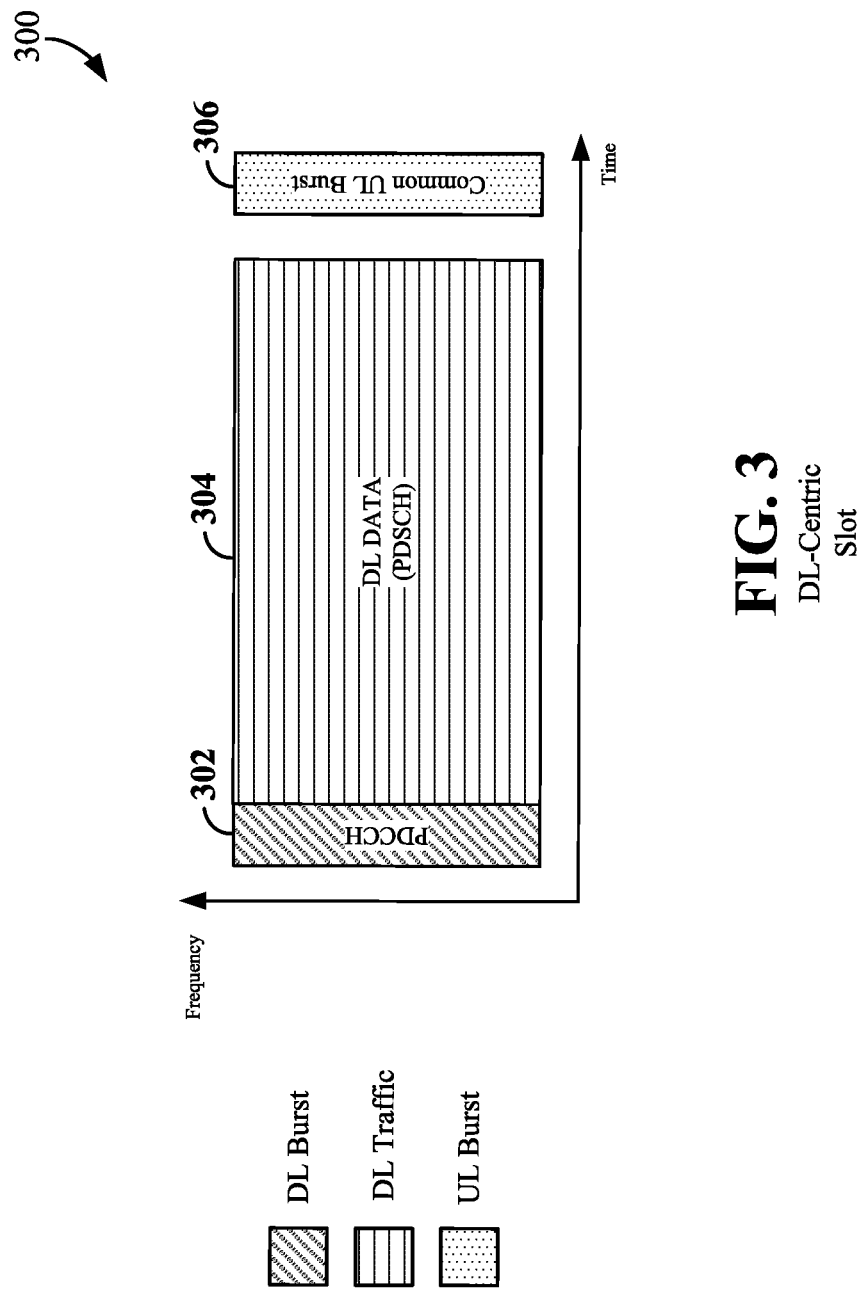
FIG. 3 is a diagram illustrating an example of a new radio (NR) downlink (DL)-centric slot in a time-division duplex (TDD) carrier according to some aspects of the present disclosure.

According to various aspects of the present disclosure, New Radio (NR) wireless communication may be implemented by dividing transmissions, in time, into frames, wherein each frame may be further divided into slots. These slots may be DL-centric or UL-centric, as described below. For example, FIG. 3 is a diagram illustrating an example of a downlink (DL)-centric slot 300 according to some aspects of the present disclosure. The nomenclature DL-centric generally refers to a structure wherein more resources are allocated for transmission in the DL direction (e.g., transmissions from the scheduling entity 202 to the scheduled entity 204). In the example shown in FIG. 3, time is illustrated along a horizontal axis, while frequency is illustrated along a vertical axis. The time-frequency resources of the DL-centric slot 300 may be divided into a DL burst 302, a DL traffic portion 304 and an UL burst 306.

The DL burst 302 may exist in the initial or beginning portion of the DL-centric slot. The DL burst 302 may include any suitable DL information in one or more channels. In some examples, the DL burst 302 may include various scheduling information and/or control information corresponding to various portions of the DL-centric slot. In some configurations, the DL burst 302 may be a physical DL control channel (PDCCH), as indicated in FIG. 3. The DL-centric slot may also include a DL traffic portion 304. The DL traffic portion 504 may sometimes be referred to as the payload of the DL-centric slot. The DL traffic portion 304 may include the communication resources utilized to communicate DL user data traffic from the scheduling entity 202 (e.g., eNB) to the scheduled entity 204 (e.g., UE). In some configurations, the DL traffic portion 304 may be a physical DL shared channel (PDSCH).

The UL burst 306 may include any suitable UL information in one or more channels. In some examples, the UL burst 306 may include feedback information corresponding to various other portions of the DL-centric slot. For example, the UL burst 306 may include feedback information corresponding to the control portion 302 and/or DL traffic portion 304. Non-limiting examples of feedback information may include an ACK signal, a NACK signal, a HARQ indicator, and/or various other suitable types of information. The UL burst 306 may include additional or alternative information, such as information pertaining to random access channel (RACH) procedures, scheduling requests (SRs), and various other suitable types of information.

As illustrated in FIG. 3, the end of the DL traffic portion 304 may be separated in time from the beginning of the UL burst 306. This time separation may sometimes be referred to as a gap, a guard period, a guard interval, and/or various other suitable terms. This separation provides time for the switchover from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric slot and alternative structures having similar features may exist without necessarily deviating from the aspects described herein.

Figure 4:
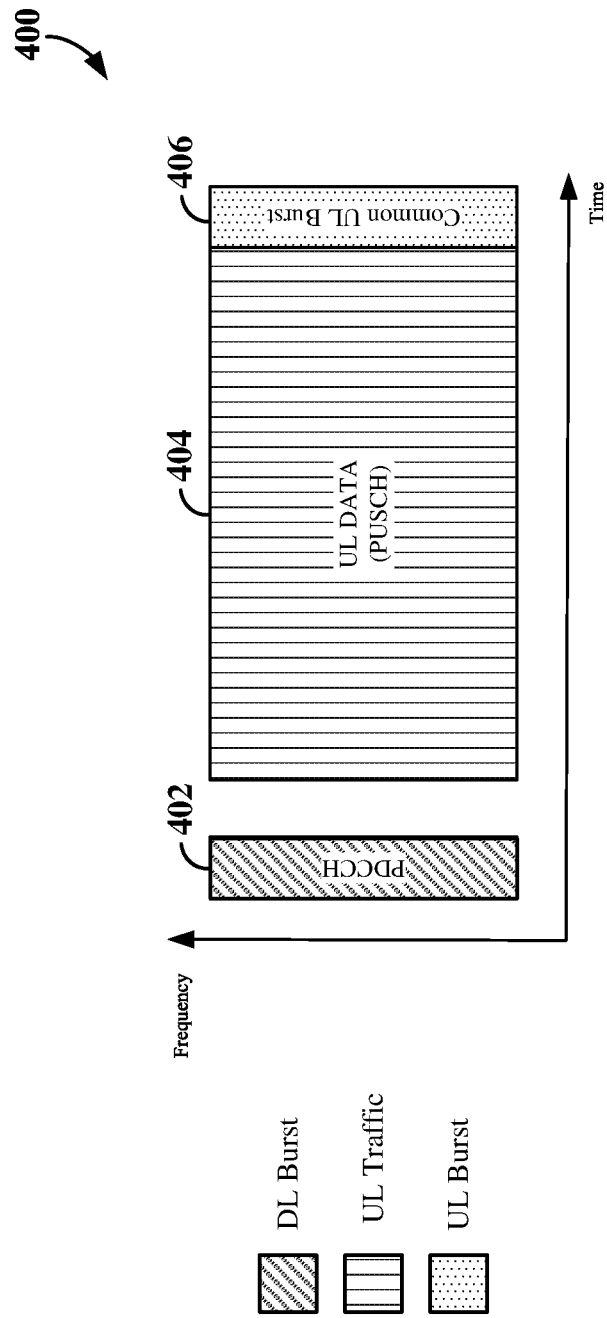
FIG. 4 is a diagram illustrating an example of a NR uplink (UL)-centric slot in a TDD carrier according to some aspects of the present disclosure.

FIG. 4 is a diagram showing an example of an uplink (UL)-centric slot 400 according to some aspects of the present disclosure. The nomenclature UL-centric generally refers to a structure wherein more resources are allocated for transmissions in the UL direction (e.g., transmissions from the scheduled entity 204 to the scheduling entity 202). In the example shown in FIG. 4, time is illustrated along a horizontal axis, while frequency is illustrated along a vertical axis. The time-frequency resources of the UL-centric slot 400 may be divided into a DL burst 402, an UL traffic portion 404 and an UL burst 406.

The DL burst 402 may exist in the initial or beginning portion of the UL-centric slot. The DL burst 402 in FIG. 4 may be similar to the DL burst 302 described above with reference to FIG. 3. The UL-centric slot may also include an UL traffic portion 404. The UL traffic portion 404 may sometimes be referred to as the payload of the UL-centric slot. The UL traffic portion 404 may include the communication resources utilized to communicate UL user data traffic from the scheduled entity 204 (e.g., UE) to the scheduling entity 202 (e.g., eNB). In some configurations, the UL traffic portion 404 may be a physical UL shared channel (PUSCH). As illustrated in FIG. 4, the end of the DL burst 402 may be separated in time from the beginning of the UL traffic portion 404. This time, separation may sometimes be referred to as a gap, guard period, guard interval, and/or various other suitable terms. This separation provides time for the switchover from DL communication (e.g., reception operation by the scheduling entity 202 (e.g., UE)) to UL communication (e.g., transmission by the scheduling entity 202 (e.g., UE)).

The UL burst 406 in FIG. 4 may be similar to the UL burst 306 described above with reference to FIG. 3. The UL burst 406 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

In various aspects of the present disclosure, New Radio (NR) wireless communication networks may support not only the NR radio access technology (RAT), but also legacy RATs, such as LTE. In addition, NR and legacy transmissions may share the same carrier within a cell. In some examples, the legacy transmissions include multi-broadcast single-frequency network (MBSFN) transmissions. In other examples, other types of legacy transmissions may be transmitted on the same carrier as NR transmissions within NR cells. In some examples, the same scheduling entity (e.g., gNB) may support both NR and LTE radio access technologies. In other examples, two different scheduling entities (e.g., a gNB and eNB) may serve the same cell, each supporting a different RAT (e.g., NR and LTE). In this example, the scheduling entities (e.g., gNB and eNB) may be communicatively coupled via a backhaul interface.

Figure 5:
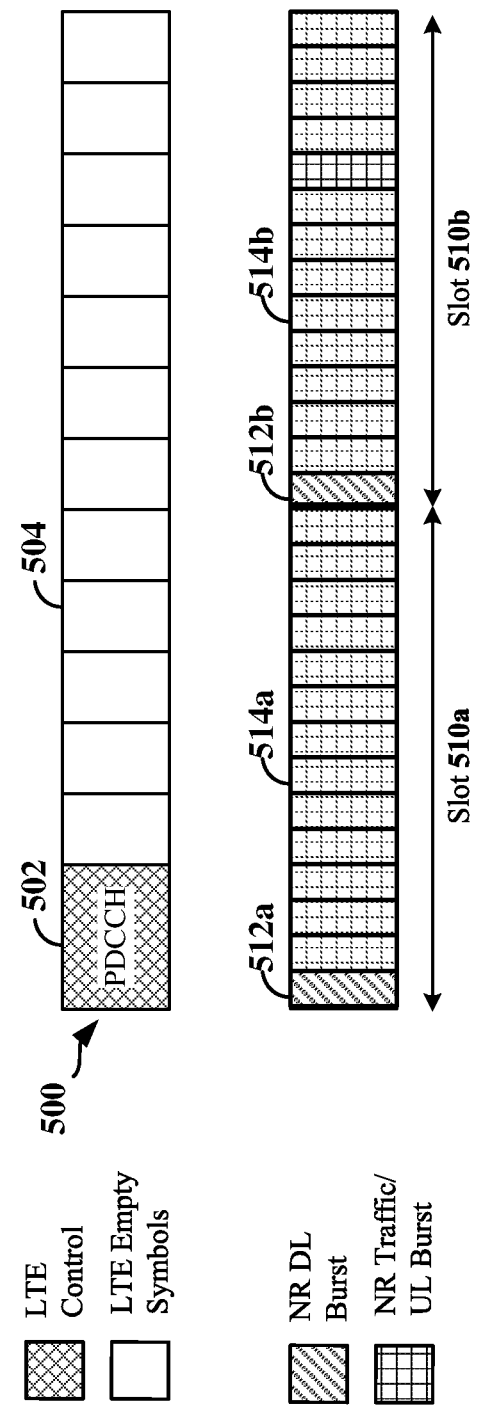
FIG. 5 is a diagram illustrating an example of NR slots sharing the same carrier with a legacy multicast-broadcast single-frequency network (MBSFN) subframe according to some aspects of the present disclosure.

FIG. 5 illustrates an example of NR slots sharing the same carrier with a legacy MBSFN subframe according to some aspects of the present disclosure. MBSFN subframes 500 may be transmitted within certain subframes of an LTE radio frame. For example, when utilizing frequency division duplexing (FDD), MBSFN subframes may be transmitted within subframes 1, 2, 3, 6, and 7 of an LTE radio frame, whereas when utilizing time division duplexing (TDD), MBSFN subframes may be transmitted within subframes 3, 4, 7, 8, and 9 of the LTE radio frame. Therefore, the downlink carrier may be shared between an MBSFN subframe 500 and one or more NR slots 510a and 510b during one of the subframes allocated for MBSFN transmissions.

In the example shown in FIG. 5, the MBSFN subframe 500 has a sub-carrier spacing of 15 kHz and includes 14 OFDM symbols, while the NR slots 510a and 510b each have a sub-carrier spacing of 30 kHz and include 14 OFDM symbols. Therefore, two NR slots 510a and 510b may be transmitted within the duration of the MBSFN subframe 500. One of ordinary skill in the art will understand that the foregoing is merely one example of the carrier spacing and number of OFDM symbols for a NR slot, and alternative slot structures having similar features may exist without necessarily deviating from the aspects described herein.

The MBSFN subframe 500 includes a control region 502 and a traffic region 504. Typically, the control region 502 includes one or two physical downlink control channel (PDCCH) symbols that include LTE control information and a cell specific reference signal (CRS). In the example shown in FIG. 7, the MBSFN subframe 500 includes two PDCCH symbols. The traffic region 504 may include MBSFN data (e.g., mobile TV) to be transmitted to one or more UEs in the cell that have subscribed to mobile TV service.

Each NR slot 510a and 510b includes a respective DL burst 512a and 512b carrying control information and a respective traffic portion 514a and 514b carrying user data traffic for UEs in the cell. In some examples, the NR slots 510a and 510b may be DL-centric slots or UL-centric slots, each of which may also further include an UL burst (not shown). In some examples, the carrier utilized for both LTE and NR may be a TDD carrier or an FDD carrier.

To facilitate coexistence between NR transmissions and LTE transmissions utilizing the same carrier within a cell, in some aspects of the present disclosure, the NR slots 510a and 510b may be transmitted during MBSFN subframes that are not carrying MBSFN data (e.g., when the traffic region 504 of an MBSFN subframe 500 is empty). However, since the PDCCH and the CRS is always transmitted each MBSFN subframe, interference may occur between the control region 502 of MBSFN subframes and NR slots 510a and 510b. For example, as shown in FIG. 5, the DL burst 512a and first three symbols of the traffic portion 514a of NR slot 510a may be transmitted during the control region 502 of the MBSFN subframe 500, which may cause interference at NR UEs. In addition, any NR transmission during the symbol that contains the LTE CRS may require the NR waveform/signal design to rate match around the LTE CRS, which is undesirable and may introduce unnecessary complexity.

Therefore, to minimize interference between legacy subframes and NR slots utilizing the same carrier within a cell and simplify NR design, a configurable slot structure may be utilized for NR slots (e.g., NR slots 510a and 510b) to avoid transmitting NR control and/or user data traffic during the transmission of the control region 502 of legacy subframes, such as MBSFN subframe 500. In some aspects of the present disclosure, the configurable slot structure may be configured to produce a NR slot (e.g., NR slot 510a) that has an effective duration that prevents transmission thereof during at least a portion of the control region 502 of the legacy subframe 500.

The configurable NR slot structure may further be configured to either align the radio frame timing between the NR slot (e.g., NR slot 510a) and the legacy subframe 500 or offset the radio frame timing between the NR slot 510a and the legacy subframe 500. When the NR slot 510a and legacy subframe 500 are aligned, as shown in FIG. 5, the NR slot may begin transmission of control information after transmission of the control region 502 of the legacy subframe 500. As such, the effective duration of the NR slot 510a begins with the transmission of the control information and continues through the end of the slot. When the NR slot 510a and legacy subframe 500 are offset, the NR slot 510a may be configured to begin after transmission of the control region 502 of the legacy subframe 500 or prior to transmission of the control region 502 of the legacy subframe 500. Thus, the radio frame timing between the NR slot 510a and the legacy subframe 500 may be offset such that the NR frame timing is earlier or later than the legacy radio frame timing.

In some examples, as mentioned above, the NR slots 510a and 510b may be transmitted when the traffic region 504 of the legacy MBSFN subframe 500 is empty. In other examples, the carrier bandwidth may be divided into a NR bandwidth for transmitting the NR slots 510a and 510b and a legacy bandwidth for transmitting the traffic region 504 of the legacy subframe 500. The control region 502 of the legacy subframe 500 may still be transmitted utilizing the entire carrier bandwidth.

Figure 6:
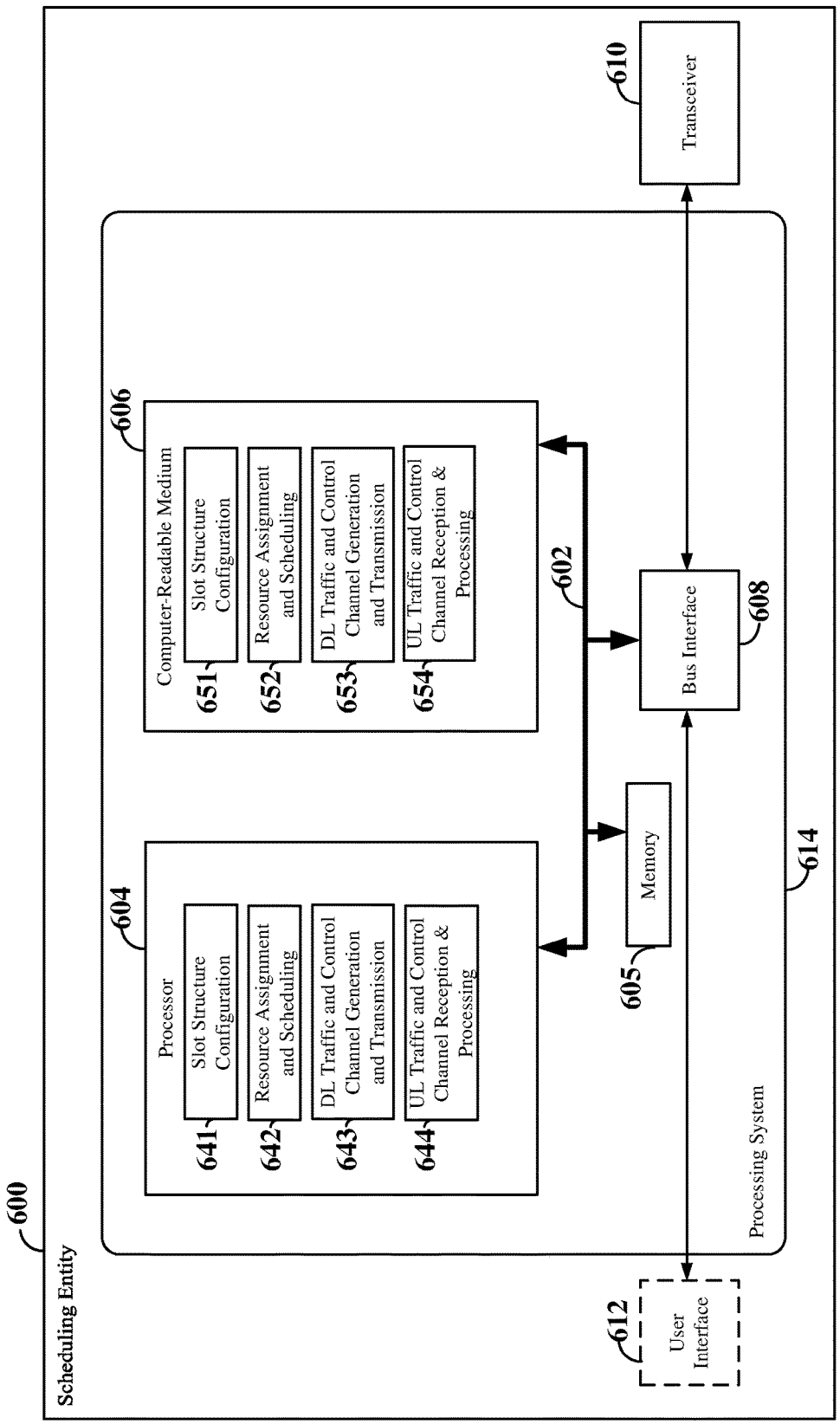
FIG. 6 is a block diagram illustrating an example of a hardware implementation for a scheduling entity employing a processing system according to some aspects of the present disclosure.

FIG. 6 is a simplified block diagram illustrating an example of a hardware implementation for a scheduling entity 600 employing a processing system 614. For example, the scheduling entity 600 may be a base station as illustrated in FIGS. 1 and/or 2. In another example, the scheduling entity 600 may be a user equipment as illustrated in FIGS. 1 and/or 2.

In various aspects of the present disclosure, the scheduling entity 600 may serve a cell that supports both a first radio access technology (RAT), such as a next generation (e.g., 5G) or New Radio (NR) RAT, and a second RAT different than the first RAT, such as a fourth generation (e.g., 4G) or LTE RAT. In some examples, the scheduling entity 600 may support both the NR and LTE RATs. In other examples, the scheduling entity 600 may support the NR RAT, while another scheduling entity coupled to the scheduling entity 600 (e.g., via a backhaul interface) may support the LTE RAT. In addition, the scheduling entity 600/serving cell may utilize the same carrier for NR transmissions and legacy transmissions. The sub-carrier spacing in the NR and legacy RATs may be the same or different. In some examples, the sub-carrier spacing for the legacy RAT may be 15 kHz, while the sub-carrier spacing for the NR RAT may be 30 kHz.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein. That is, the processor 604, as utilized in a scheduling entity 600, may be used to implement any one or more of the processes described below. The processor 604 may in some instances be implemented via a baseband or modem chip and in other implementations, the processor 604 may itself comprise a number of devices distinct and different from a baseband or modem chip (e.g., in such scenarios is may work in concert to achieve embodiments discussed herein).

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, an optional user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606.

The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the present disclosure, the processor 604 may include circuitry configured for various functions. For example, the processor 604 may include slot structure configuration circuitry 641, configured to provide a configurable next generation (e.g., New Radio (NR)) slot structure to facilitate coexistence with legacy subframes utilizing the same carrier within the cell served by the scheduling entity 600. In some examples, the shared carrier may be an FDD downlink carrier. In other examples, the shared carrier may be a TDD carrier.

The slot structure configuration circuitry 641 may configure the configurable NR slot structure. Configuration may occur as a function of sub-carrier spacing and number of symbols per slot, for example. In some particular examples, the sub-carrier spacing may be 15 kHz or 30 kHz and the number of symbols per slot may be 7 symbols or 14 symbols.

The slot structure configuration circuitry 641 may further be configured to identify a subframe structure utilized for legacy subframes. In some examples, the legacy subframe may be a MBSFN subframe. In other examples, the legacy subframe may be another type of subframe. In some examples, the subframe structure of the legacy subframe includes a control region and a traffic region. The control region may include, for example, one or two physical downlink control channel (PDCCH) symbols that include legacy control information and a cell specific reference signal (CRS). The traffic region may include, for example, MBSFN data (e.g., mobile TV data) to be transmitted to one or more scheduled entities in the serving cell that have subscribed to mobile TV service. The legacy subframe structure may also utilize, for example, a fixed sub-carrier spacing (e.g., 15 kHz) and a fixed number of symbols (e.g., 14 symbols).

In some aspects of the present disclosure, the slot structure configuration circuitry 641 may be configured to select an effective duration of the configurable slot structure to produce a NR slot. The effective duration may be selected to prevent transmissions within the NR slot from occurring during the transmission of the control region of a legacy subframe. As used herein, the term effective duration refers to a number of symbols of a NR slot within which control information or user data traffic may be transmitted. In some examples, the effective duration includes the entire duration (e.g., all symbols) of the NR slot and may include any suitable number of symbols. For example, the slot structure configuration circuitry 641 may configure the configurable slot structure to produce a NR slot with fewer symbols than a regular seven symbol NR slot or fewer symbols than a regular fourteen symbol NR slot. In other examples, the effective duration includes a portion of the duration (e.g., a portion of the total number of symbols) of the NR slot.

The slot structure configuration circuitry 641 may further be configured to generate subframe structure information including the configuration of the subframe structure of the legacy subframe (e.g., one or two control symbols) to be transmitted via a system information block (SIB) within a regular (e.g., 14 symbol) NR slot. From the subframe structure information, a scheduled entity may determine the control search space location within the legacy subframe. In addition, in various aspects of the present disclosure, the subframe structure information may indicate the effective duration of the NR slot and location of the control search space within the NR slot. For example, the NR slot structure may be fixed in the cell based on the number of control symbols in the legacy subframe.

The slot structure configuration circuitry 641 may further be configured to generate common control information including the effective duration of the NR slot for transmission to a group of scheduled entities within the NR slot. For example, the group common control information may indicate whether the NR slot is a shortened slot that includes a shorter effective duration than regular NR slots. The number of symbols of the shortened slot may be transmitted, for example, within a system information block (SIB) within a regular NR slot. In addition, the slot structure configuration circuitry 641 may be configured to transmit the respective configuration of the respective duration of different slot types, each associated with a different legacy subframe structure, via a system information block (SIB) within a regular NR slot.

The slot structure configuration circuitry 641 may further be configured to generate respective control information including the effective slot duration for each scheduled entity for transmission within respective individual PDCCHs (e.g., UE-specific PDCCHs) for those scheduled entities. In some examples, the control information may include the actual number of symbols within the traffic region of the shortened NR slot.

In some examples, the slot structure configuration circuitry 641 may determine that a legacy subframe is scheduled to be transmitted, but no data or other user data traffic is scheduled for transmission within the traffic region of the legacy subframe. The slot structure configuration circuitry 641 may then configure the configurable slot structure to enable a NR slot to be scheduled during the legacy subframe. In particular, the slot structure configuration circuitry 641 may configure the configurable slot structure to produce a NR slot that has an effective duration that avoids transmissions of the NR slot during the control region of the legacy subframe.

In other examples, the slot structure configuration circuitry 641 may divide the bandwidth (e.g., frequency resources) of the carrier between legacy and NR transmissions. For example, the slot structure configuration circuitry 641 may divide the frequency resources of the carrier into a first bandwidth (e.g., a first portion of the sub-carriers) for transmission of the traffic region of the legacy subframe and a second (non-overlapping) bandwidth (e.g., a second portion of the sub-carriers) for transmission of the NR slot. In addition, the slot structure configuration circuitry 641 may determine that the control region of the legacy subframe may be transmitted over the entire bandwidth (e.g., all sub-carriers).

In this example, the slot structure configuration circuitry 641 may configure the configurable slot structure for a NR slot to occupy the second bandwidth during transmission of the traffic region of the legacy subframe. In addition, the slot structure configuration circuitry 641 may select the effective duration of the NR slot to avoid transmission of the NR slot during transmission of the control region of the legacy subframe. In some examples, the slot structure configuration circuitry 641 may configure the configurable slot structure to produce a NR mini-slot with self-contained control information. A mini-slot may have a reduced number of symbols as compared to a NR slot, and therefore, may more easily be scheduled to avoid the control region of the legacy subframe.

In addition, the slot structure configuration circuitry 641 may further configure the configurable slot structure for the NR slot such that the first symbol of the NR slot carries a group common PDCCH and occupies only a portion of the second bandwidth allocated to NR transmissions within the carrier. The group common PDCCH may include, for example, the NR slot format (e.g., effective duration) and the configuration of the UE-specific search space (e.g., location of the UE-specific search space within the NR slot).

The slot structure configuration circuitry 641 may further be configured to either align the radio frame timing between the NR slot and the legacy subframe or offset the radio frame timing between the NR slot and the legacy subframe. When the radio frame timing of the NR slot and legacy subframe are aligned, the slot structure configuration circuitry 641 may configure the configurable slot structure to begin transmission of control information within a NR slot after transmission of the control region of the legacy subframe. Thus, the effective duration of the NR slot begins with the transmission of the control information and continues through the end of the slot.

The slot structure configuration circuitry 641 may further be configured to generate control search space information indicating a control search space within the NR slot for transmission to the scheduled entities within the serving cell. The control search space information may be transmitted, for example, within a system information block (SIB) of a regular NR slot. In some examples, the control search space information may indicate the configuration of the legacy subframe (e.g., one or two control symbols). In this example, the NR slot structure (and control search space) for the NR slot may fixed in the cell based on the legacy subframe structure. For example, the control search space in the NR slot may be included within the first symbol of the NR slot that may be transmitted immediately after the last symbol of the control region of the legacy subframe.

In some examples, the control search space information may indicate a UE-specific search space within the NR slot, which may be transmitted within common control information of the NR slot (e.g., a group common control PDCCH). In other examples, the group common control PDCCH containing the NR UE-specific control search space information may be transmitted within the control region of the legacy subframe. For example, a portion of the control region of the legacy subframe may be punctured to enable the group common control PDCCH containing NR UE-specific control search space information to be transmitted within the punctured portion. In this example, the slot structure configuration circuitry 641 may ensure that the punctured portion of the control region of the legacy subframe did not include the PCFICH, PHICH, and CRS in the legacy subframe. Thus, the NR group common control PDCCH may be transmitted within a portion of the control region of the legacy subframe that does not contain the PCFICH, PHICH, or CRS.

When the radio frame timing of the NR slot and legacy subframe are offset, the slot structure configuration circuitry 641 may configure the configurable slot structure to begin after transmission of the control region of the legacy subframe or prior to transmission of the control region of the legacy subframe. In some examples, the slot structure configuration circuitry 641 may configure the configurable slot structure to offset transmission of a first symbol of the NR slot in time with transmission of the first symbol of the legacy subframe. For example, the slot structure configuration circuitry 641 may identify the number of control symbols in the control region of the legacy subframe, and configure the configurable slot structure to offset transmission of control information in the NR slot in time with transmission of the control region of the legacy subframe based on the number of control symbols. In some examples, the slot structure configuration circuitry 641 may configure the configurable slot structure based on a fixed number of control symbols (e.g., a highest possible number of control symbols) in the control region of the legacy subframe.

In some examples, the slot structure configuration circuitry 641 may configure the configurable slot structure to begin transmission of the first symbol of the NR slot after transmission of the control region of the legacy subframe. In other examples, the slot structure configuration circuitry 641 may configure the configurable slot structure to begin transmission of the first symbol of the NR slot prior to transmission of the first symbol in the control region of the legacy subframe.

In addition, the slot structure configuration circuitry 641 may further be configured to avoid transmission of any data (e.g., control information and/or user data traffic) within at least a portion of the control region of the legacy subframe. In this example, if more than one control symbol is included in the NR slot, the slot structure configuration circuitry 641 may configure the configurable slot structure such that all control symbols of the NR slot are transmitted prior to the control region of the legacy subframe. In other examples, if more than one control symbol is included in both the NR slot and the legacy subframe, the slot structure configuration circuitry 641 may configure the configurable slot structure to puncture the first symbol of the legacy subframe to transmit the last control symbol of the NR slot within the duration of the first symbol of the legacy subframe. In either example, the slot structure configuration circuitry 641 may configure the configurable slot structure to prevent transmission of user data traffic during transmission of the control region of the legacy subframe. The slot structure configuration circuitry 641 may then generate traffic information to be transmitted within the control information of the NR slot that indicates a starting symbol for the user data traffic within the NR slot. The traffic information may be included, for example, within a group common PDCCH or within each UE-specific PDCCH.

When the legacy subframe is an MBSFN subframe, the slot structure configuration circuitry 641 may further be configured to determine whether the immediately previous legacy subframe is also an empty MBSFN subframe. If so, the slot structure configuration circuitry 641 may be configured to configure the configurable slot structure to begin the NR slot at the end of the MBSFN subframe. If the immediately preceding legacy subframe includes MBSFN data or if the immediately preceding legacy subframe is a non-MBSFN subframe, the slot structure configuration circuitry 641 may be configured to puncture the end of the immediately previous legacy subframe (e.g. the last symbol) to transmit the control information for the NR slot during the end of the immediately previous legacy subframe. In other examples, if the immediately preceding legacy subframe includes MBSFN data or if the immediately preceding legacy subframe is a non-MBSFN subframe, the control information for the NR slot may be included in another previous NR slot, which may be transmitted, for example, during a previous empty MBSFN subframe.

In some examples, when using an FDD or TDD carrier, the slot structure configuration circuitry 641 may provide a configurable DL-centric NR slot structure to ensure transmissions within a DL-centric NR slot do not occur during at least a portion of the control region of the legacy subframe. In addition, the slot structure configuration circuitry 641 may provide a configurable UL-centric NR slot structure to ensure transmissions within an UL-centric slot do not occur during at least a portion of the control region of the legacy subframe.

In some examples, when the NR DL radio frame timing is different from the radio frame timing of a different radio access technology (e.g., LTE), the slot structure configuration circuitry 641 may determine a respective timing advance (TA) for uplink transmissions from each scheduled entity based on the respective propagation delay experienced by each scheduled entity and modify each timing advance, if necessary, based on the number of control symbols in the legacy subframe to align the timing reception of uplink transmissions of the different RATs. The modified timing advance may be provided to the scheduled entities via TA commands, or the timing advance offset (e.g., offset between the actual timing advance and the modified timing advance) may be provided to the scheduled entities via explicit signaling. The slot structure configuration circuitry 641 may further be configured to operate in coordination with slot structure configuration software 651 or an associated module.

The processor 604 may further include resource assignment and scheduling circuitry 642, configured to generate, schedule, and modify a resource assignment or grant of time-frequency resources (e.g., a set of one or more resource elements). For example, the resource assignment and scheduling circuitry 642 may schedule time-frequency resources within a plurality of time division duplex (TDD) and/or frequency division duplex (FDD) legacy subframes and/or NR slots to carry user data traffic and/or control information to and/or from multiple UEs (scheduled entities). In various aspects of the present disclosure, the resource assignment and scheduling circuitry 642 may be configured to schedule time-frequency resources for a NR slot based on the slot structure configured by the slot structure configuration circuitry 641. The resource assignment and scheduling circuitry 642 may further operate in coordination with resource assignment and scheduling software 652.

The processor 604 may further include downlink (DL) traffic and control channel generation and transmission circuitry 643, configured to generate and transmit downlink user data traffic and control signals/channels. For example, the DL traffic and control channel generation and transmission circuitry 643 may be configured to generate master information blocks (MIBs), master or other system information blocks (SIBs), and/or radio resource control (RRC) connection or configuration messages, and various channels, such as the PBCH (which may carry the MIB and/or SIB), PSS, SSS, and/or physical hybrid automatic repeat request (HARQ) indicator channel (PHICH).

The DL traffic and control channel generation and transmission circuitry 643 may further be configured to generate a physical downlink shared channel (PDSCH) including downlink user data traffic or other data (e.g., MBSFN data). In addition, the DL traffic and control channel generation and transmission circuitry 643 may operate in coordination with the resource assignment and scheduling circuitry 642 and slot structure configuration circuitry 641 to schedule the DL user data traffic, other data and/or control information and to place the DL user data traffic, other data and/or control information onto a time division duplex (TDD) or frequency division duplex (FDD) carrier within one or more legacy subframes and/or one or more NR slots in accordance with the resources assigned to the DL user data traffic, other data and/or control information. The DL traffic and control channel generation and transmission circuitry 643 may further be configured to multiplex DL transmissions utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The DL traffic and control channel generation and transmission circuitry 643 may further be configured to generate one or more physical downlink control channels (PDCCHs), which may be common PDCCHs, group common PDCCHs, and/or UE-specific PDCCHs that include downlink control information (DCI). In some examples, the DCI may include control information indicating an assignment of downlink resources for downlink user data traffic or a grant of uplink or sidelink resources for one or more scheduled entities. The DL traffic and control channel generation and transmission circuitry 643 may operate in coordination with the resource assignment and scheduling circuitry 642 and slot structure configuration circuitry 641 to place the PDCCHs within the one or more legacy subframes and/or one or more NR slots in accordance with the resources assigned to the PDCCHs.

In various aspects of the present disclosure, the DL traffic and control channel generation and transmission circuitry 643 may further be configured to receive subframe structure information including the configuration of the subframe structure of the legacy subframe (e.g., one or two control symbols) from the slot structure configuration circuitry 641 and to transmit the subframe structure information via a system information block (SIB) within a regular (e.g., 14 symbol) NR slot. The DL traffic and control channel generation and transmission circuitry 643 may further be configured to receive common control information (or group common control information) including the effective duration of the NR slot from the slot structure configuration circuitry 641 and to transmit the common control information (or group common control information) to a plurality of scheduled entities within the NR slot. For example, group common control information transmitted to a group of UEs (i.e., a subset of the UEs within the cell) may indicate whether the NR slot that may contain information for those UEs in the group is a shortened slot that includes a shorter effective duration than regular NR slots. The DL traffic and control channel generation and transmission circuitry 643 may further be configured to transmit the number of symbols of the shortened slot within, for example, a system information block (SIB) within a regular NR slot. The DL traffic and control channel generation and transmission circuitry 643 may further be configured to receive respective control information including the effective slot duration for each scheduled entity and to transmit the respective individual PDCCHs (e.g., UE-specific PDCCHs) to those scheduled entities.

The DL traffic and control channel generation and transmission circuitry 643 may further be configured to receive control search space information indicating a control search space within the NR slot from the slot structure configuration circuitry 641 and to transmit the control search space information to the scheduled entities within the serving cell. The control search space information may be transmitted, for example, within a system information block (SIB) of a regular NR slot. In some examples, the control search space information may indicate a UE-specific search space within the NR slot, which may be transmitted within common control information of the NR slot (e.g., a group common control PDCCH). In other examples, the group common control PDCCH containing the NR UE-specific control search space information may be transmitted within the control region of the legacy subframe by puncturing a portion of the control region of the legacy subframe.

The DL traffic and control channel generation and transmission circuitry 643 may further be configured to receive traffic information that indicates a starting symbol for the user data traffic within the NR slot from the slot structure configuration circuitry 641 and to transmit the traffic information within the control information of the NR slot. The traffic information may be included, for example, within a group common PDCCH or within each UE-specific PDCCH. The DL traffic and control channel generation and transmission circuitry 643 may further be configured to receive respective modified timing advances (or timing advance offsets) for each scheduled entity in the serving cell and transmit the modified timing advances (or timing advance offsets) to the scheduled entities. For example, the modified timing advances may be transmitted via TA commands, while the timing advance offsets may be transmitted to the scheduled entities via explicit signaling. The DL traffic and control channel generation and transmission circuitry 643 may further operate in coordination with DL traffic and control channel generation and transmission software 653.

The processor 604 may further include uplink (UL) traffic and control channel reception and processing circuitry 644, configured to receive and process uplink control channels and uplink traffic channels from one or more scheduled entities. For example, the UL traffic and control channel reception and processing circuitry 644 may be configured to receive a scheduling request from a scheduled entity. The UL traffic and control channel reception and processing circuitry 644 may further be configured to provide the scheduling request to the resource assignment and scheduling circuitry 642 for processing. The UL traffic and control channel reception and processing circuitry 644 may further be configured to receive uplink user data traffic from one or more scheduled entities, which may be transmitted from the scheduled entities according to modified timing advances or timing advance offsets. In general, the UL traffic and control channel reception and processing circuitry 644 may operate in coordination with the resource assignment and scheduling circuitry 642 to schedule UL traffic transmissions, DL traffic transmissions and/or DL traffic retransmissions in accordance with the received UL control information. The UL traffic and control channel reception and processing circuitry 644 may further operate in coordination with UL traffic and control channel reception and processing software 654.

Figure 7:
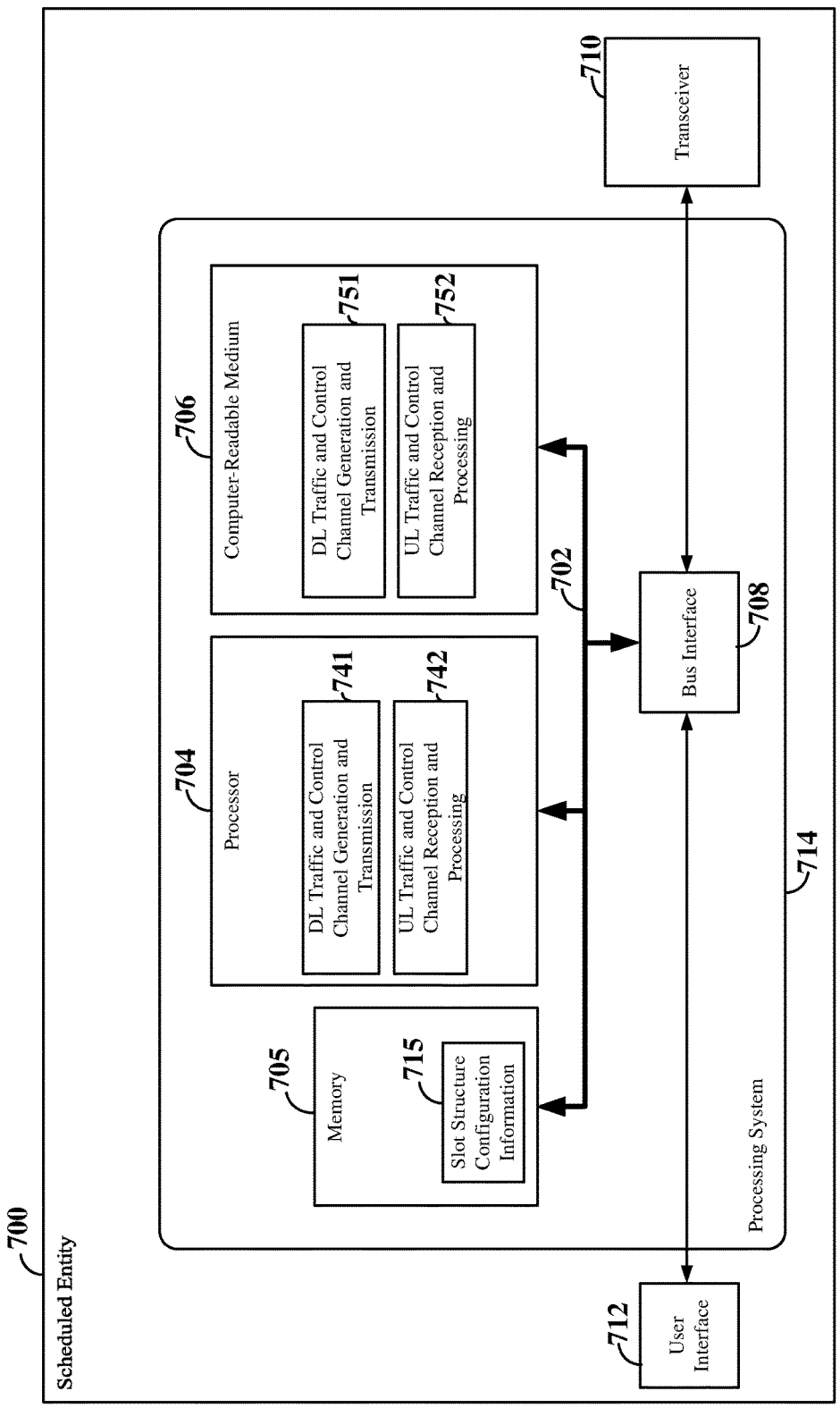
FIG. 7 is a block diagram illustrating an example of a hardware implementation for a scheduled entity employing a processing system according to some aspects of the present disclosure.

FIG. 7 is a conceptual diagram illustrating an example of a hardware implementation for an exemplary scheduled entity 700 employing a processing system 714. In accordance with various aspects of the present disclosure, an element, or any portion of an element, or any combination of elements may be implemented with a processing system 714 that includes one or more processors 704. For example, the scheduled entity 700 may be a user equipment (UE) as illustrated in any one or more of FIGS. 1 and 2.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6. That is, the processor 704, as utilized in a scheduled entity 700, may be used to implement any one or more of the processes described below.

In some aspects of the present disclosure, the processor 704 may include downlink (DL) traffic and control channel reception and processing circuitry 741, configured for receiving and processing downlink user data traffic on a downlink traffic channel (e.g., PDSCH) of a DL-centric slot, and to receive and process control information on one or more downlink control channels (e.g., PDCCHs) of a DL-centric slot or an UL-centric slot.

In various aspects of the present disclosure, the DL traffic and control channel reception and processing circuitry 741 may further be configured to receive slot structure configuration information 715 indicating the DL-centric slot structure and/or UL-centric slot structure configured for transmission over a carrier shared with legacy subframes. For example, the slot structure configuration information 715 may include the effective duration of a NR slot, number of symbols in the traffic portion of the NR slot, the starting symbol of the traffic portion of the NR slot, the control search space within the NR slot, a modified timing advance or timing advance offset for an UL-centric slot, a bandwidth within the carrier allocated for NR transmissions, a portion of the NR bandwidth assigned to group common PDCCH, a legacy subframe structure (e.g., number of control symbols) and/or other suitable slot structure configuration information. The slot structure configuration information 715 may be stored, for example, in memory 705. The DL traffic and control channel reception and processing circuitry 741 may operate in coordination with DL traffic and control channel reception and processing software 751.

The processor 704 may include uplink (UL) traffic and control channel generation and transmission circuitry 742, configured to generate and transmit uplink control/feedback/acknowledgement information on an UL control channel. For example, the UL traffic and control channel generation and transmission circuitry 742 may be configured to generate and transmit an uplink control channel (e.g., a Physical Uplink Control Channel (PUCCH)) within an uplink burst of a DL-centric slot or UL-centric slot or within an uplink traffic portion of an UL-centric slot in accordance with an uplink grant and/or based on the slot structure configuration information 715. The UL traffic and control channel generation and transmission circuitry 742 may further be configured to generate and transmit uplink user data traffic on an UL traffic channel (e.g., a PUSCH) within an uplink traffic portion of an UL-centric slot in accordance with an uplink grant based on the slot structure configuration information 715. The UL traffic and control channel generation and transmission circuitry 742 may operate in coordination with UL traffic and control channel generation and transmission software 752.

Figure 8:
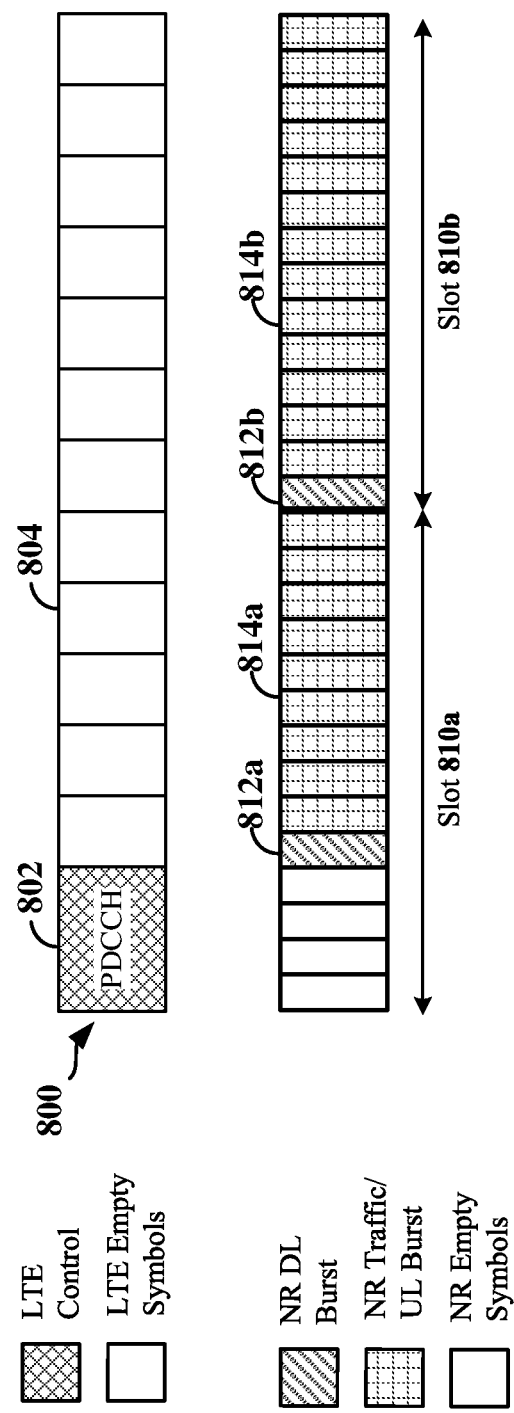
FIG. 8 is a diagram illustrating an exemplary alignment between legacy and next generation radio frames according to some aspects of the present disclosure.

FIG. 8 is a diagram illustrating an exemplary alignment between legacy and next generation radio frames according to some aspects of the present disclosure. In the example shown in FIG. 8, the radio frame timing of a legacy subframe 800 is aligned with the radio frame timing of next generation (e.g., New Radio (NR)) slots 810a and 810b. In addition, the legacy subframe 800 has a sub-carrier spacing of 15 kHz and includes 14 OFDM symbols, while the NR slots 810a and 810b may, for example, have a sub-carrier spacing of 30 kHz and each may include 14 OFDM symbols. Therefore, two NR slots 810a and 810b may occur within the duration of the legacy subframe 800.

As in the example shown in FIG. 5, the legacy subframe 800 includes a control region 802 and a traffic region 804. The control region 802 includes LTE control information and a cell specific reference signal (CRS). In the example shown in FIG. 8, the control region 802 includes two PDCCH symbols. If the legacy subframe 800 is an MBSFN subframe, the traffic region 804 may include MBSFN data (e.g., mobile TV) to be transmitted to one or more UEs in the cell that have subscribed to mobile TV service. However, in the example shown in FIG. 8, the traffic region 804 is empty (e.g., the traffic region does not include any MBSFN data).

Each NR slot 810a and 810b includes a DL burst 812a or 812b that may carry control information and a traffic portion 814a or 814b that may carry user data traffic for UEs in the cell. In some examples, the NR slots 810a and 810b may be DL-centric slots or UL-centric slots, each of which may also further include an UL burst (not shown). In some examples, the carrier utilized for both LTE and NR may be a TDD carrier or an FDD carrier.

To facilitate coexistence between the legacy subframe 800 and NR slots 810a and 810b, the effective duration (and thus, the effective slot length) of the first NR slot 810a may be configured (e.g., shortened) to prevent any transmissions within the first NR slot 810a from occurring during the control region 802 of the legacy subframe 800. Thus, the DL burst 812a of the first NR slot 810a may be delayed until the fifth symbol of the NR slot 810a, leaving the first four symbols of the NR slot 810a empty. As slot 810a includes 14 OFDM symbols, as an example, the first NR slot 810a effectively includes only 10 symbols. The second NR slot 810b fills the remaining section of the traffic portion 804 of the legacy subframe 800 and maintains the regular 14 symbols, with the first symbol including the DL burst 812b.

Figure 9:
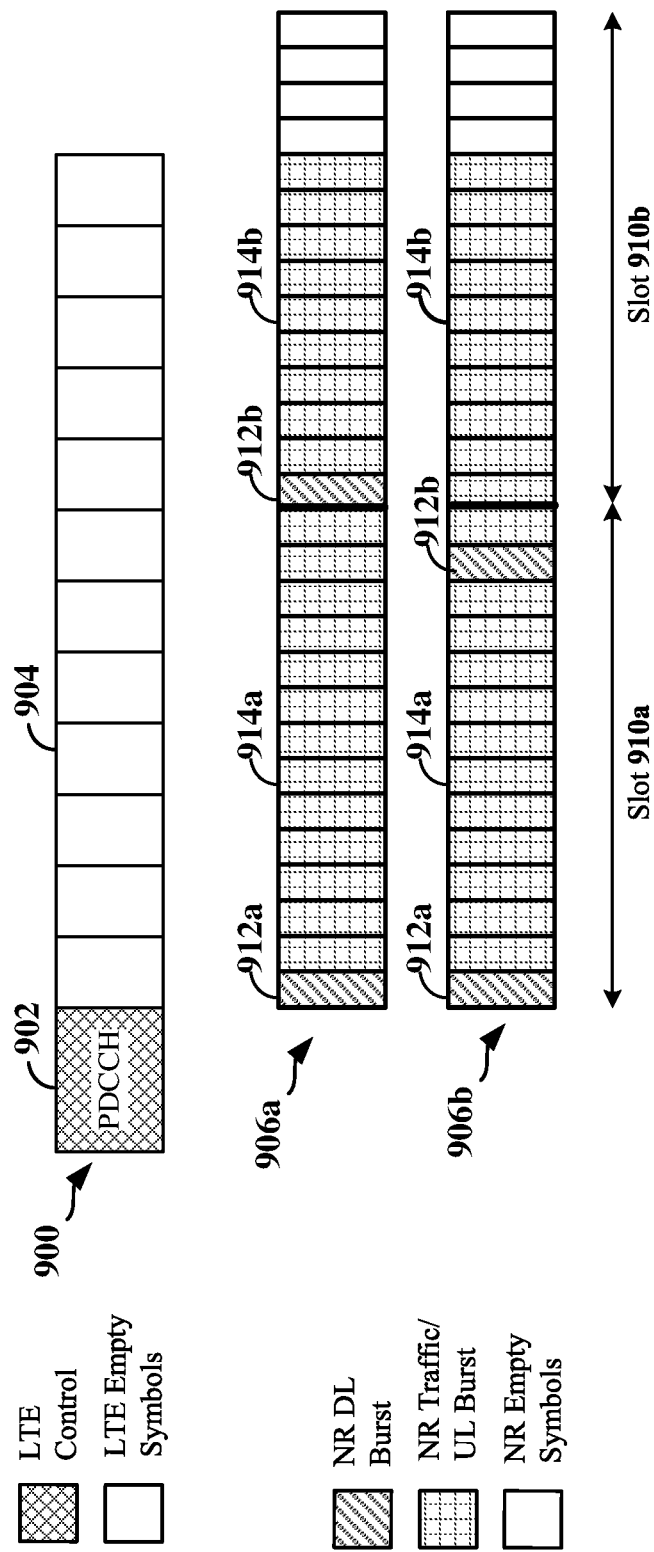
FIG. 9 is a diagram illustrating an exemplary offset between legacy and next generation radio frames according to some aspects of the present disclosure.

FIG. 9 is a diagram illustrating an exemplary offset between legacy and next generation radio frames according to some aspects of the present disclosure. In the example shown in FIG. 9, the radio frame timing of a legacy subframe 900 is offset from the radio frame timing of next generation (e.g., New Radio (NR)) slots 910a and 910b. In addition, the legacy subframe 900 has a sub-carrier spacing of 15 kHz and includes 14 OFDM symbols, while the NR slots 910a and 910b may, for example, have a sub-carrier spacing of 30 kHz and each may include 14 OFDM symbols. Therefore, two NR slots 910a and 910b may occur within the duration of the legacy subframe 900.

As in the examples shown in FIGS. 5 and 8, the legacy subframe 900 includes a control region 902 and a traffic region 904. The control region 902 includes LTE control information and a cell specific reference signal (CRS). In the example shown in FIG. 9, the control region 902 includes two PDCCH symbols. If the legacy subframe 900 is an MBSFN subframe, the traffic region 904 may include MBSFN data (e.g., mobile TV) to be transmitted to one or more UEs in the cell that have subscribed to mobile TV service. However, in the example shown in FIG. 9, the traffic region 904 is empty (e.g., the traffic region does not include any MBSFN data).

Each NR slot 910a and 910b includes a DL burst 912a or 912b that may carry control information and a traffic portion 914a or 914b that may carry user data traffic for UEs in the cell. Two different examples 906a and 906b of NR slots 910a and 910b are illustrated in FIG. 9. In the top example 906a of NR slots 910a and 910b, the DL burst 912a and 912b are each included within the respective NR slots 910a and 910b themselves. However, in the bottom example 906b of NR slots 910a and 910b, the DL burst 912b for NR slot 910b is included at the end of NR slot 910a. In some examples, the NR slots 910a and 910b may be DL-centric slots or UL-centric slots, each of which may also further include an UL burst (not shown). In addition, the carrier utilized for both LTE and NR may be a TDD carrier or an FDD carrier.

To facilitate coexistence between the legacy subframe 900 and NR slots 910a and 910b, the beginning of the first NR slot 910a may occur after the end of the control region 902 of the legacy subframe 900 to prevent any transmissions within the first NR slot 910a from occurring during the control region 902 of the legacy subframe 900. In addition, the effective duration (and thus, the effective slot length) of one or more of the first NR slot 910a and the second NR slot 910b may be configured (e.g., shortened) to prevent NR transmissions from occurring during the next legacy subframe (not shown). Thus, in both the top and bottom NR slot examples 906a and 906b shown in FIG. 9, the last four symbols of the second NR slot 910b are empty. In addition, in both the top of bottom NR slot examples 906a and 906b, the first symbol of the first NR slot 910a carrying the DL burst 912a begins during the first symbol of the traffic region 904 of the legacy subframe 900.

In the top example 906a of NR slots, the first NR slot 910a includes, as an example, 14 symbols, which leaves only 10 symbols for the effective duration of the second NR slot 910b. However, in the bottom example 906b of NR slots, the second NR slot 910b begins during the first NR slot 910a. For example, the DL burst 912b of the second NR slot 910b may be placed within the second-to-last symbol of the first NR slot 910a and the last symbol of the first NR slot 910a may begin the traffic region 914b of the second NR slot 910a. Thus, the effective duration of each of the NR slots 910a and 910b in the bottom example 906b is 12 symbols.

Figure 10:
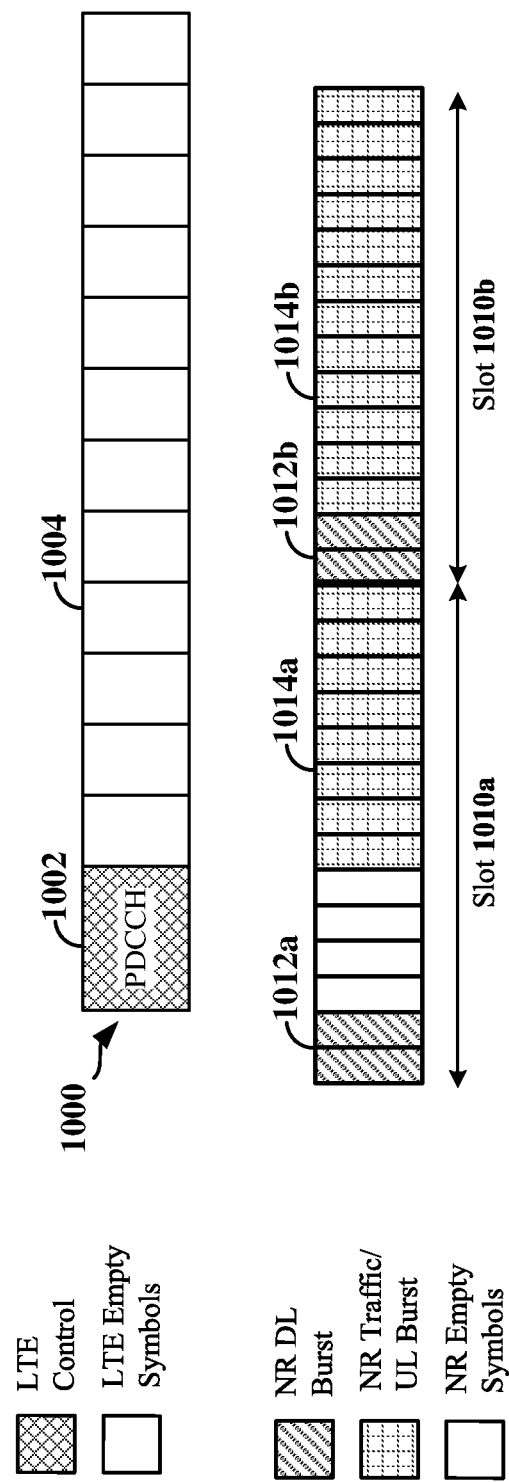
FIG. 10 is a diagram illustrating another exemplary offset between legacy and next generation radio frames according to some aspects of the present disclosure.

FIG. 10 is a diagram illustrating another exemplary offset between legacy and next generation radio frames according to some aspects of the present disclosure. In the example shown in FIG. 10, the radio frame timing of a legacy subframe 1000 is offset from the radio frame timing of next generation (e.g., New Radio (NR)) slots 1010a and 1010b. In addition, the legacy subframe 1000 has a sub-carrier spacing of 15 kHz and includes 14 OFDM symbols, while the NR slots 1010a and 1010b may, for example, have a sub-carrier spacing of 30 kHz and each may include 14 OFDM symbols. Therefore, two NR slots 1010a and 1010b may occur within the duration of the legacy subframe 1000.

As in the examples shown in FIGS. 5, 8, and 9, the legacy subframe 1000 includes a control region 1002 and a traffic region 1004. The control region 1002 includes LTE control information and a cell specific reference signal (CRS). In the example shown in FIG. 10, the control region 1002 includes two PDCCH symbols. If the legacy subframe 1000 is an MBSFN subframe, the traffic region 1004 may include MBSFN data (e.g., mobile TV) to be transmitted to one or more UEs in the cell that have subscribed to mobile TV service. However, in the example shown in FIG. 10, the traffic region 1004 is empty (e.g., the traffic region does not include any MBSFN data).

Each NR slot 1010a and 1010b includes a DL burst 1012a or 1012b that may carry control information and a traffic portion 1014a or 1014b that may carry user data traffic for UEs in the cell. In the example shown in FIG. 10, each DL burst 1012a and 1012b includes two symbols. In some examples, the NR slots 1010a and 1010b may be DL-centric slots or UL-centric slots, each of which may also further include an UL burst (not shown). In addition, the carrier utilized for both LTE and NR may be a TDD carrier or an FDD carrier.

To facilitate coexistence between the legacy subframe 1000 and NR slots 1010a and 1010b, the beginning of the first NR slot 1010a may occur prior to the beginning of the control region 1002 of the legacy subframe 1000. In the example shown in FIG. 10, the NR slot 1010a is configured such that all control symbols within the DL burst 1012a of the first NR slot 1010a are transmitted prior to the control region 1002 of the legacy subframe 1000. In addition, to prevent transmission of user data traffic during transmission of the control region 1002 of the legacy subframe 1000, the effective duration of the first NR slot 1010a may be shortened. In particular, as shown in FIG. 10, the symbols in the first NR slot 1010a that coincide in time with the control region 1002 of the legacy subframe 1000 may be empty (and therefore, not considered as part of the effective duration of the first NR slot 1010a).

In some examples, traffic information may be transmitted within the DL burst 1012a of the first NR slot 1010a that indicates a starting symbol for the user data traffic within the first NR slot 1010a. The traffic information may be included, for example, within a group common PDCCH or within each UE-specific PDCCH in the DL burst 1012a. In addition, for UL-centric slots, a respective timing advance (TA) for uplink transmissions from each scheduled entity within the first NR slot 1010a may be determined based on the respective propagation delay experienced by each scheduled entity and then modified, if necessary, based on the number of control symbols in the legacy subframe 1000 to align the timing reception of uplink transmissions of the different RATs. In some examples, the modified timing advances or timing advance offsets may be provided to the scheduled entities within the DL burst 1012a of the first NR slot 1010a.

Figure 11:
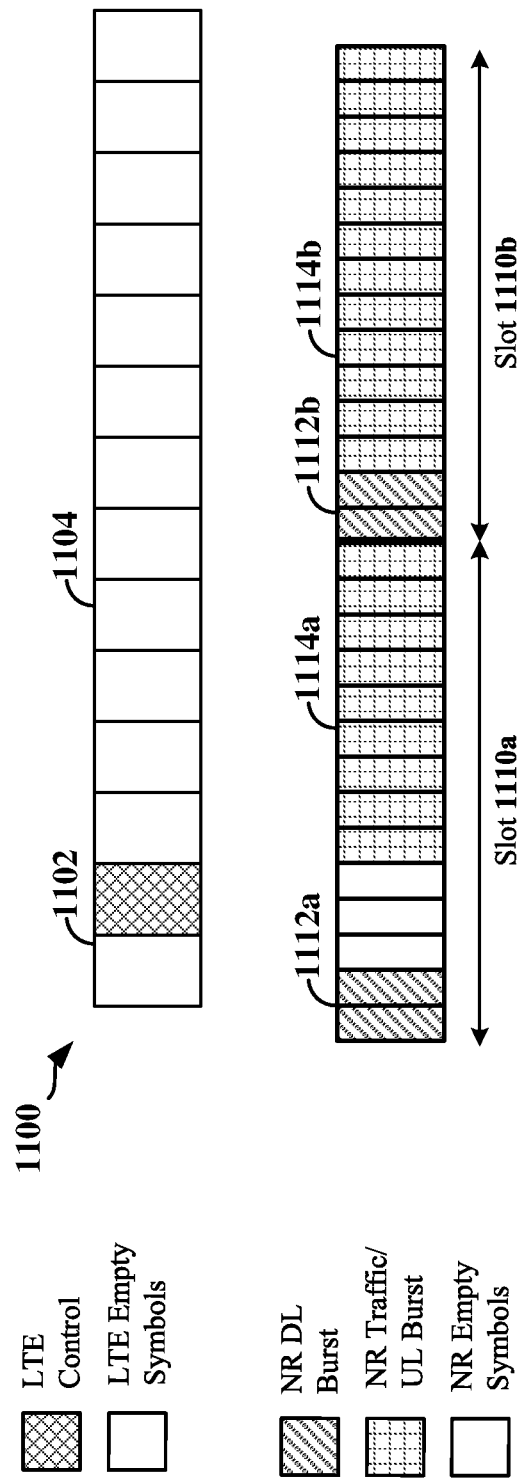
FIG. 11 is a diagram illustrating another exemplary offset between legacy and next generation radio frames according to some aspects of the present disclosure.

FIG. 11 is a diagram illustrating another exemplary offset between legacy and next generation radio frames according to some aspects of the present disclosure. In the example shown in FIG. 11, the radio frame timing of a legacy subframe 1100 is offset from the radio frame timing of next generation (e.g., New Radio (NR)) slots 1110a and 1110b. In addition, the legacy subframe 1100 has a sub-carrier spacing of 15 kHz and includes 14 OFDM symbols, while the NR slots 1110a and 1110b may, for example, have a sub-carrier spacing of 30 kHz and each may include 14 OFDM symbols. Therefore, two NR slots 1110a and 1110b may occur within the duration of the legacy subframe 1100.

As in the examples shown in FIGS. 5 and 8-10, the legacy subframe 1100 includes a control region 1102 and a traffic region 1104. The control region 1102 includes LTE control information and a cell specific reference signal (CRS). In the example shown in FIG. 11, the control region 1102 includes two PDCCH symbols. If the legacy subframe 1100 is an MBSFN subframe, the traffic region 1104 may include MBSFN data (e.g., mobile TV) to be transmitted to one or more UEs in the cell that have subscribed to mobile TV service. However, in the example shown in FIG. 11, the traffic region 1104 is empty (e.g., the traffic region does not include any MBSFN data).

Each NR slot 1110a and 1110b includes a DL burst 1112a or 1112b that may carry control information and a traffic portion 1114a or 1114b that may carry user data traffic for UEs in the cell. In the example shown in FIG. 11, each DL burst 1112a and 1112b includes two symbols. In some examples, the NR slots 1110a and 1110b may be DL-centric slots or UL-centric slots, each of which may also further include an UL burst (not shown). In addition, the carrier utilized for both LTE and NR may be a TDD carrier or an FDD carrier.

To facilitate coexistence between the legacy subframe 1100 and NR slots 1110a and 1110b, the beginning of the first NR slot 1110a may occur prior to the beginning of the control region 1102 of the legacy subframe 1100. In the example shown in FIG. 11, the NR slot 1110a is configured such that the first control symbol within the DL burst 1112a of the first NR slot 1110a is transmitted prior to the control region 1102 of the legacy subframe 1100. However, the second control symbol within the DL burst 1112a of the first NR slot 1110a is transmitted during the control region 1102 of the legacy subframe 1110. To prevent legacy transmissions during the transmission of the DL burst 1112a of the first NR slot 1110a, the first symbol of the control region 1102 of the legacy subframe 1110 may be punctured to transmit the last control symbol of the DL burst 1112a of the first NR slot 1110a within the duration of the first symbol of the control region 1102 of the legacy subframe 1100. In this example, the CRS may be transmitted within the second symbol of the control region 1102 of the legacy subframe 1100.

In addition, to prevent transmission of user data traffic during transmission of the control region 1102 of the legacy subframe 1100, the effective duration of the first NR slot 1110a may be configured (e.g., shortened). In particular, as shown in FIG. 11, the traffic symbols in the first NR slot 1110a that coincide in time with the control region 1102 of the legacy subframe 1100 may be empty (and therefore, not considered as part of the effective duration of the first NR slot 1110a). In some examples, traffic information may be transmitted within the DL burst 1112a of the first NR slot 1110a that indicates a starting symbol for the user data traffic within the first NR slot 1110a. The traffic information may be included, for example, within a group common PDCCH or within each UE-specific PDCCH in the DL burst 1112a. In addition, for UL-centric slots, a respective timing advance (TA) for uplink transmissions from each scheduled entity within the first NR slot 1110a may be determined based on the respective propagation delay experienced by each scheduled entity and then modified, if necessary, based on the number of control symbols in the legacy subframe 1100 to align the timing reception of uplink transmissions of the different RATs. In some examples, the modified timing advances or timing advance offsets may be provided to the scheduled entities within the DL burst 1012a of the first NR slot 1010a.

Figure 12:
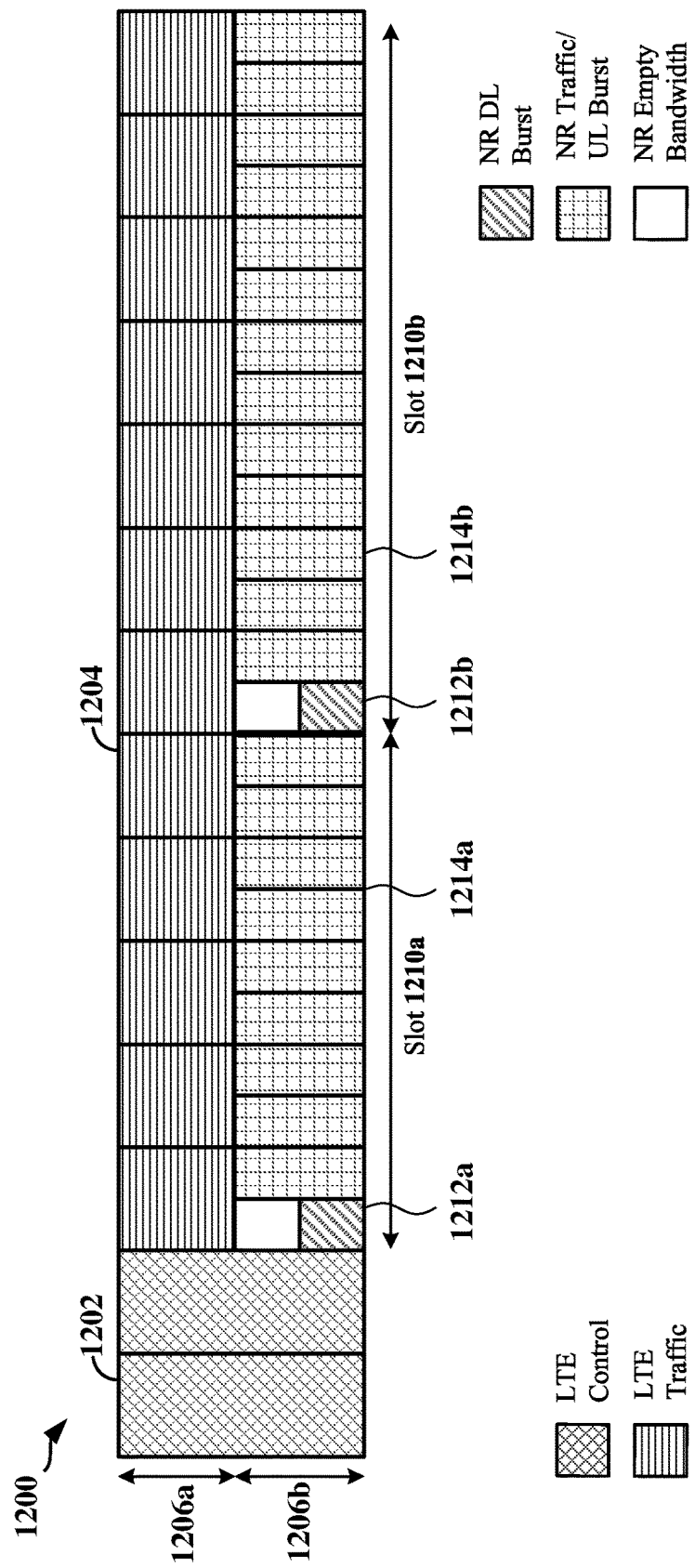
FIG. 12 is a diagram illustrating frequency resource sharing between NR slots and legacy MBSFN subframes according to some aspects of the present disclosure.

FIG. 12 is a diagram illustrating frequency resource sharing between NR slots and legacy MBSFN subframes according to some aspects of the present disclosure. As in FIGS. 8-11, the legacy subframe 1200 has a sub-carrier spacing of 15 kHz, while the NR slots 1210a and 1210b may, for example, have a sub-carrier spacing of 30 kHz. Therefore, two NR slots 1210a and 1210b may occur within the duration of the legacy subframe 1200. In addition, the legacy subframe 1200 includes a control region 1202 and a traffic region 1204. The control region 1202 includes LTE control information and a cell specific reference signal (CRS). In the example shown in FIG. 12, the control region 1202 includes two PDCCH symbols. If the legacy subframe 1200 is an MBSFN subframe, the traffic region 1204 may include MBSFN data (e.g., mobile TV) to be transmitted to one or more UEs in the cell that have subscribed to mobile TV service.

Each NR slot 1210a and 1210b includes a DL burst 1212a or 1212b that may carry control information and a traffic portion 1214a or 1214b that may carry user data traffic for UEs in the cell. In some examples, the NR slots 1210a and 1210b may be DL-centric slots or UL-centric slots, each of which may also further include an UL burst (not shown). In addition, the carrier utilized for both LTE and NR may be a TDD carrier or an FDD carrier.

To facilitate coexistence between the legacy subframe 1200 and NR slots 1210a and 1210b, as shown in FIG. 12, the frequency resources (bandwidth) of the carrier may be divided into a first bandwidth 1206a and a second bandwidth 1206b. The first bandwidth 1206a may be utilized to transmit the traffic region 1204 of the legacy subframe 1200, while the second bandwidth 1206b may be utilized to transmit NR slots 1210a and 1210b. The entire bandwidth (e.g., the combination of bandwidths 1206a and 1206b) may be utilized to transmit the control region 1202 of the legacy subframe 1200.

In the example shown in FIG. 12, the traffic region 1204 of the legacy subframe 1200 is not empty. For example, the traffic region 1204 may include MBSFN data when the legacy subframe 1200 is an MBSFN subframe or the traffic region 1204 may include other user data traffic when the legacy subframe 1200 is another type of legacy subframe. As further shown in FIG. 12, the DL burst 1212a and 1212b of each NR slot 1210a and 1210b includes common control information that occupies only a portion of the second bandwidth. The common control information may contain, for example, the slot format (e.g., duration of the slot) and an indication of the location of UE-specific control search spaces within the traffic portion 1214a and 1214b. In some examples, the UE-specific control search spaces may be located in the first symbol of the traffic portions 1214a and 12104b. Thus, the remaining UE-specific DCI may be scheduled within the first symbol of the traffic portions 1214a and 1214b.

In addition, the radio frame timing of the legacy subframe 1200 may be offset from the radio frame timing of NR slots 1210a and 1210b. For example, the beginning of the first NR slot 1210a may occur after the end of the control region 1202 of the legacy subframe 1200 to prevent any transmissions within the first NR slot 1210a from occurring during the control region 1202 of the legacy subframe 1200. Thus, the first symbol of the first NR slot 1210a carrying the DL burst 1212a may begin during the first symbol of the traffic region 1204 of the legacy subframe 1200. In the example shown in FIG. 12, the slot length of the first NR slot 1210a has been shortened to 10 symbols, and as such, the actual duration, not just the effective duration, of the first NR slot 1210a is 10 symbols. The second NR slot 1210a maintains the regular duration of 14 symbols.

Figure 13:
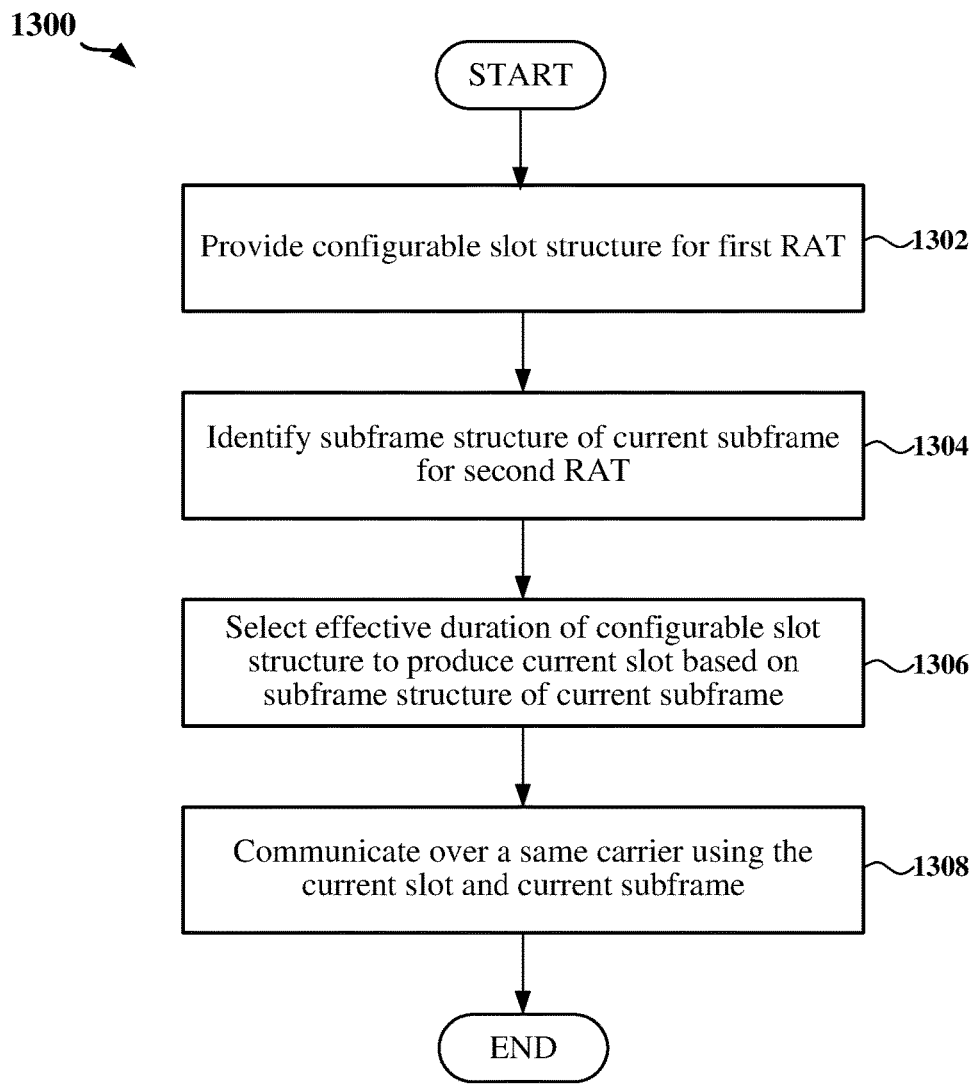
FIG. 13 is a flowchart illustrating an exemplary process for facilitating coexistence between NR and legacy transmissions utilizing a same carrier according to some aspects of the present disclosure.

FIG. 13 is a flowchart illustrating an exemplary process 1300 for facilitating coexistence between NR and legacy transmissions utilizing a same carrier according to some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity illustrated in FIG. 6. In some examples, the process 1300 may be carried out by any suitable apparatus or means for carrying out the functions or algorithm described below.

At block 1302, the scheduling entity may provide a configurable slot structure for a serving cell of the scheduling entity for a first radio access technology (RAT), such as the New Radio (NR) RAT. For example, the slot structure configuration circuitry 641 shown and described above in reference to FIG. 6 may provide the configurable slot structure.

At block 1304, the scheduling entity may identify the subframe structure of a current subframe for a second RAT supported by the cell served by the scheduling entity. For example, the second RAT may be a legacy RAT, such as LTE. The subframe structure may indicate the number of control symbols and the type of subframe (e.g., MBSFN subframe). In some examples, the scheduling entity (e.g., gNB) may support both the first RAT and the second RAT. In other examples, the scheduling entity (e.g., gNB) may support the first RAT, while another scheduling entity (e.g., an eNB) that also serves the same cell may support the second RAT. In this example, the two scheduling entities (e.g., gNB and eNB) may be communicatively coupled via a backhaul interface. For example, the slot structure configuration circuitry 641 shown and described above in reference to FIG. 6 may identify the subframe structure of the current subframe.

At block 1306, the scheduling entity may select an effective duration for the configurable slot structure to produce a current slot. The effective duration of the current slot may be selected based on the subframe structure of the current subframe. For example, the effective duration may be selected to prevent transmissions within the current slot from occurring during transmission of a control region of the current subframe. In one example, the effective duration may be selected to transmit the current slot during the traffic region of the current subframe when the traffic region of the current subframe is empty (e.g., when the traffic symbols within an MBSFN subframe are empty).

In some examples, the current slot may be a mini-slot that includes self-contained control information. In some examples, the current subframe may utilize a first carrier spacing and the current slot may utilize a second carrier spacing that is different from the first carrier spacing. For example, the slot structure configuration circuitry 641 shown and described above in reference to FIG. 6 may select the effective duration of the current slot.

At block 1308, the scheduling entity may communicate with a set of one or more scheduled entities over a same carrier using the current subframe and the current slot. In some examples, the current slot may be transmitted during a traffic region of the current subframe when the traffic region of the current subframe is empty or when the carrier bandwidth is divided between legacy and NR transmissions. For example, the resource assignment and scheduling circuitry 642, DL traffic and control channel generation and transmission circuitry 643, and UL traffic and control channel reception and processing circuitry 644 shown and described above in reference to FIG. 3 may facilitate communication of both the current subframe and the current slot over the same carrier.

Figure 14:
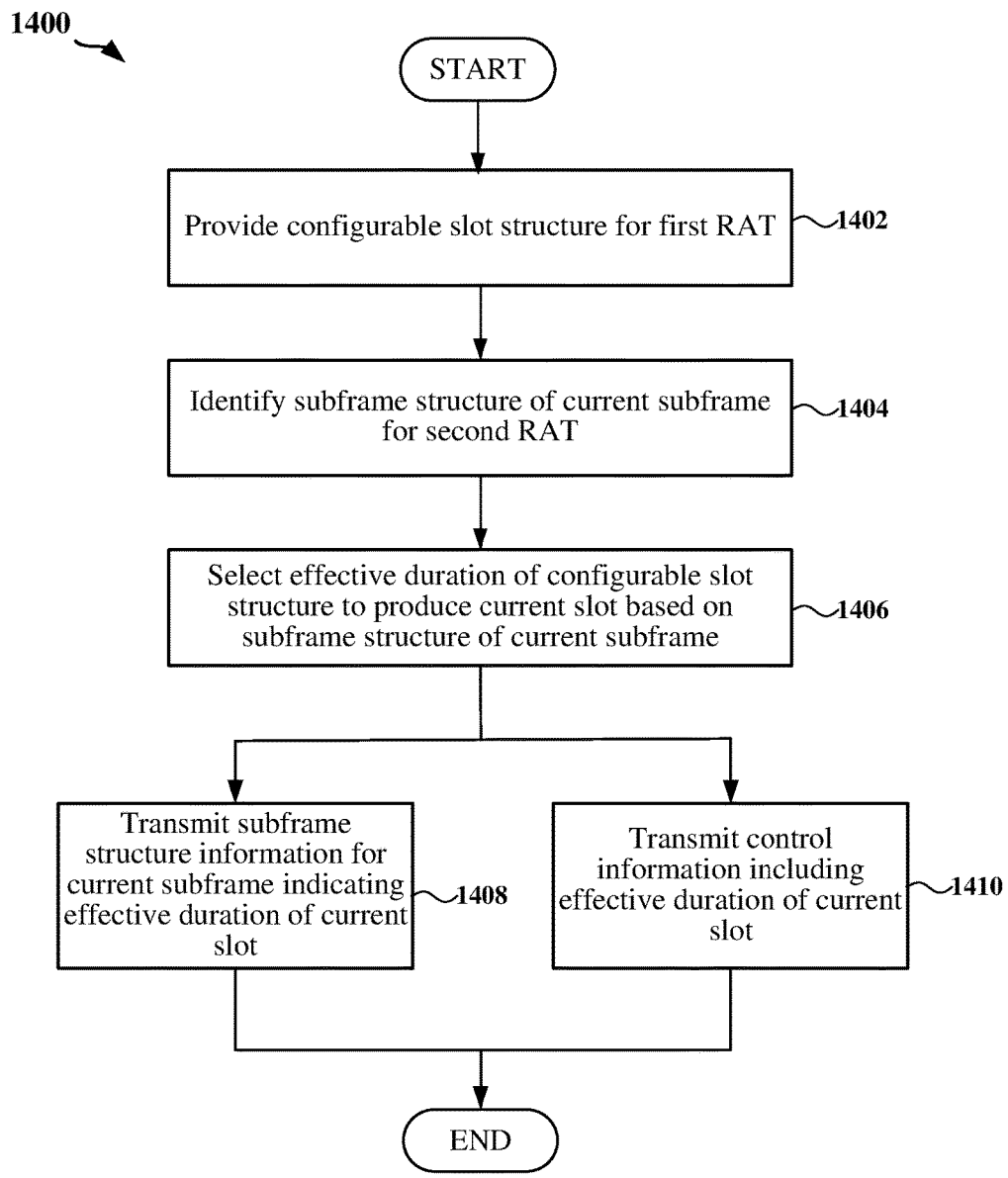
FIG. 14 is a flowchart illustrating another exemplary process for facilitating coexistence between NR and legacy transmissions utilizing a same carrier according to some aspects of the present disclosure.

FIG. 14 is a flowchart illustrating an exemplary process 1400 for facilitating coexistence between NR and legacy transmissions utilizing a same carrier according to some aspects of the present disclosure. As described below, some or all illustrated features may be omitted in a particular implementation within the scope of the present disclosure, and some illustrated features may not be required for implementation of all embodiments. In some examples, the process 1400 may be carried out by the scheduling entity illustrated in FIG. 6. In some examples, the process 1400 may be carried out by any suitable apparatus or means for carrying out the functions or algorithm described below.

At block 1402, the scheduling entity may provide a configurable slot structure for a serving cell of the scheduling entity for a first radio access technology (RAT), such as the New Radio (NR) RAT. For example, the slot structure configuration circuitry 641 shown and described above in reference to FIG. 6 may provide the configurable slot structure.

At block 1404, the scheduling entity may identify the subframe structure of a current subframe for a second RAT supported by the scheduling entity. For example, the second RAT may be a legacy RAT, such as LTE. The subframe structure may indicate the number of control symbols and the type of subframe (e.g., MBSFN subframe). For example, the slot structure configuration circuitry 641 shown and described above in reference to FIG. 6 may identify the subframe structure of the current subframe.

At block 1406, the scheduling entity may select an effective duration for the configurable slot structure to produce a current slot. The effective duration of the current slot may be selected based on the subframe structure of the current subframe. For example, the effective duration may be selected to prevent transmissions within the current slot from occurring during transmission of a control region of the current subframe. For example, the slot structure configuration circuitry 641 shown and described above in reference to FIG. 6 may select the effective duration of the current slot.

At block 1408, the scheduling entity may transmit subframe structure information including the configuration of the current subframe to a set of one or more scheduled entities. The subframe structure information may indicate the effective duration of the current slot to the set of one or more scheduled entities. In some examples, the subframe structure information may indicate whether the current subframe includes one or two control symbols. The subframe structure may be transmitted, for example, via a system information block (SIB) within a regular (e.g., 14 symbol) next generation slot. From the subframe structure information, a scheduled entity may determine the control search space location within the legacy subframe. In addition, the subframe structure information may indicate the location of the control search space within the current slot. For example, the configurable slot structure may be fixed in the cell based on the number of control symbols in the current subframe. For example, the DL traffic and control channel generation and transmission circuitry 643 shown and described above in reference to FIG. 6 may transmit the subframe structure information.

At block 1410, instead of transmitting the subframe structure information, the scheduling entity may transmit control information including the effective duration of the current slot. In some examples, the control information may include common control information that is transmitted to the set of one or more scheduled entities. In this example, the common control information may indicate whether the current slot is a shortened slot that includes a shorter effective duration than regular slots. In other examples, the control information may include respective control information (e.g., UE-specific control information) that is transmitted to each scheduled entity in the set of one or more scheduled entities. For example, the DL traffic and control channel generation and transmission circuitry 643 shown and described above in reference to FIG. 6 may transmit the control information.

Figure 15:
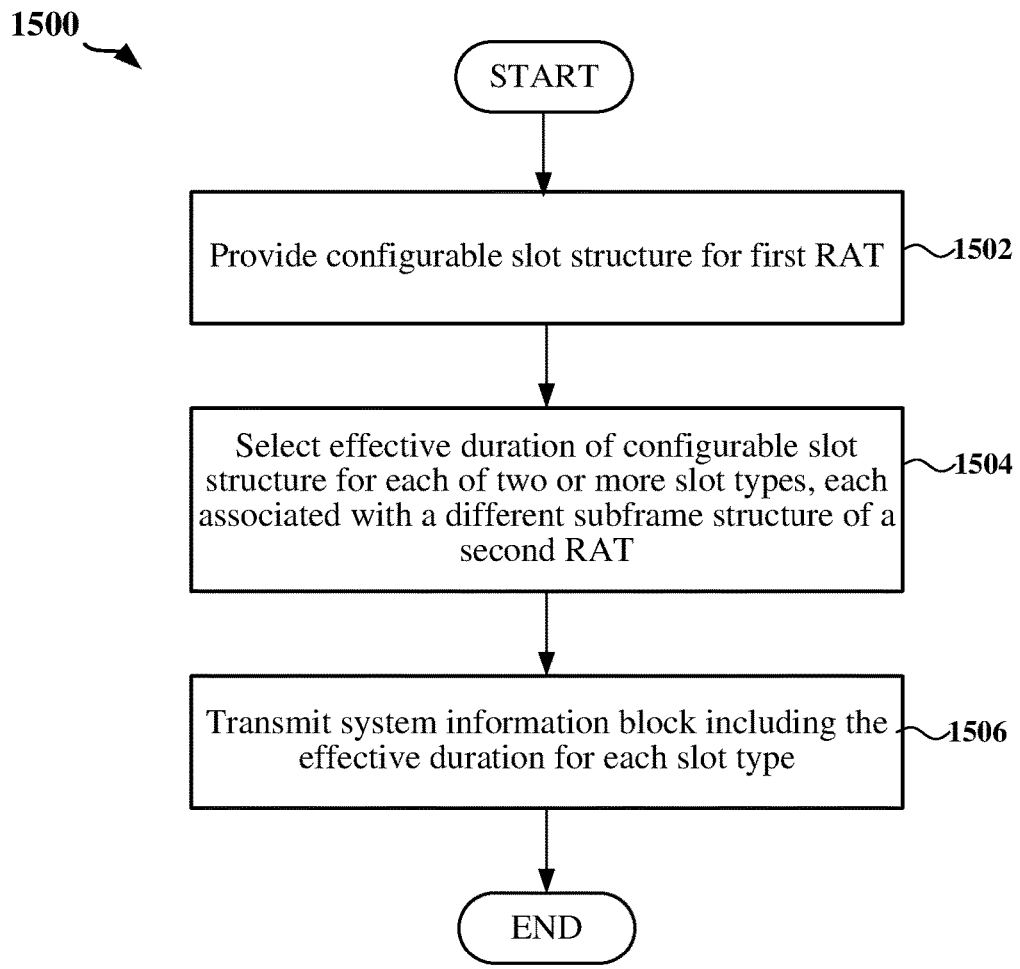
FIG. 15 is a flowchart illustrating another exemplary process for facilitating coexistence between NR and legacy transmissions utilizing a same carrier according to some aspects of the present disclosure.

FIG. 15 is a flowchart illustrating an exemplary process 1500 for facilitating coexistence between NR and legacy transmissions utilizing a same carrier according to some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduling entity illustrated in FIG. 6. In some examples, the process 1500 may be carried out by any suitable apparatus or means for carrying out the functions or algorithm described below.

At block 1502, the scheduling entity may provide a configurable slot structure for a serving cell of the scheduling entity for a first radio access technology (RAT), such as the New Radio (NR) RAT. For example, the slot structure configuration circuitry 641 shown and described above in reference to FIG. 6 may provide the configurable slot structure.

At block 1504, the scheduling entity may select an effective duration of the configurable slot structure for each of two or more slot types, each associated with a different subframe structure of a second RAT supported by the scheduling entity. For example, the second RAT may be a legacy RAT, such as LTE. For example, the slot structure configuration circuitry 641 shown and described above in reference to FIG. 6 may select the respective effective duration for two or more slot types.

At block 1506, the scheduling entity may transmit the respective configuration of the respective duration of the two or more slot types via a system information block (SIB) within, for example, a regular next generation slot. For example, the DL traffic and control channel generation and transmission circuitry 643 shown and described above in reference to FIG. 6 may transmit the effective duration for each slot type.

Figure 16:
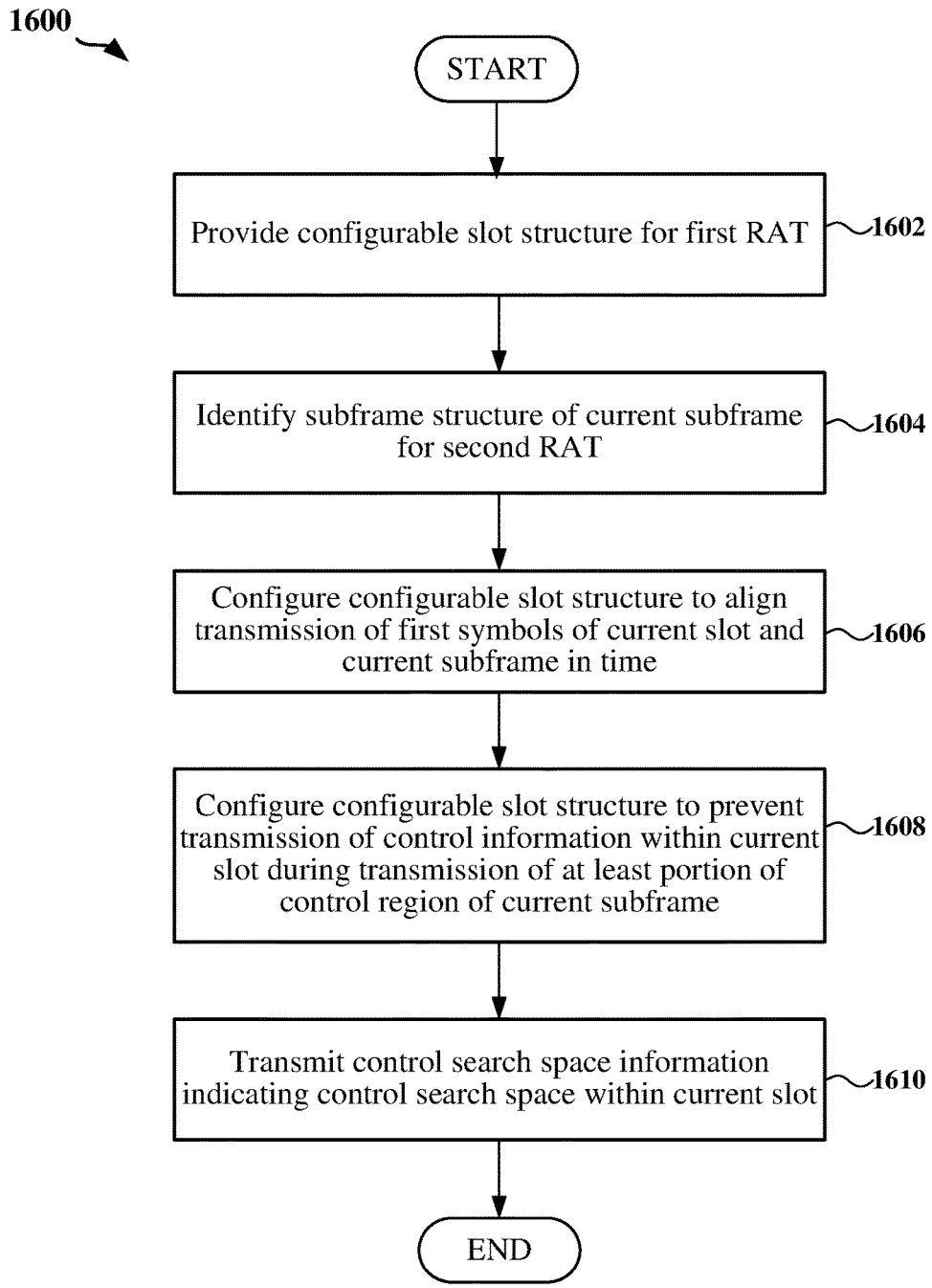
FIG. 16 is a flowchart illustrating another exemplary process for facilitating coexistence between NR and legacy transmissions utilizing a same carrier according to some aspects of the present disclosure.

FIG. 16 is a flowchart illustrating an exemplary process 1600 for facilitating coexistence between NR and legacy transmissions utilizing a same carrier according to some aspects of the present disclosure. As described below, some or all illustrated features may be omitted in a particular implementation within the scope of the present disclosure, and some illustrated features may not be required for implementation of all embodiments. In some examples, the process 1600 may be carried out by the scheduling entity illustrated in FIG. 6. In some examples, the process 1600 may be carried out by any suitable apparatus or means for carrying out the functions or algorithm described below.

At block 1602, the scheduling entity may provide a configurable slot structure for a serving cell of the scheduling entity for a first radio access technology (RAT), such as the New Radio (NR) RAT. For example, the slot structure configuration circuitry 641 shown and described above in reference to FIG. 6 may provide the configurable slot structure.

At block 1604, the scheduling entity may identify the subframe structure of a current subframe for a second RAT supported by the scheduling entity. For example, the second RAT may be a legacy RAT, such as LTE. The subframe structure may indicate the number of control symbols and the type of subframe (e.g., MBSFN subframe). For example, the slot structure configuration circuitry 641 shown and described above in reference to FIG. 6 may identify the subframe structure of the current subframe.

At block 1606, the scheduling entity may configure the configurable slot structure to align the transmission of a first symbol of the current slot in time with the transmission of a first symbol of the current subframe. An example of symbol alignment is shown in FIG. 8. For example, the slot structure configuration circuitry 641 shown and described above in reference to FIG. 6 may align transmission of the first symbols of the current slot and the current subframe in time.

At block 1608, the scheduling entity may configure the configurable slot structure to prevent transmission of control information within the current slot during transmission of at least a portion of the control region of the current subframe. In some examples, by aligning the first symbols of the current slot and the current subframe, the current slot may begin transmission of control information after the first symbol of the current slot (e.g., after transmission of the control region of the current subframe). As such, the effective duration of the current slot may begin at the symbol where transmission of the control information begins and continue through the end of the slot. For example, the slot structure configuration circuitry 641 shown and described above in reference to FIG. 6 may prevent transmission of control information within the current slot during transmission of at least a portion of the control region of the current subframe.

At block 1610, the scheduling entity may transmit control search space information to a set of one or more scheduled entities. In some examples, the control search space information may indicate a control search space within the current slot. The control search space information may be transmitted, for example, within a system information block (SIB) of a regular next generation slot. For example, the control search space in the current slot may be within the first symbol of the current slot that is transmitted immediately after the last symbol of the control region of the current subframe. In some examples, the control search space information may indicate a UE-specific search space within the current slot, and the control search space information may be transmitted within common control information of the current slot (e.g., a group common control PDCCH). In other examples, the group common control PDCCH containing the UE-specific control search space information may be transmitted within a portion of the control region of the current subframe. For example, the DL traffic and control channel generation and transmission circuitry 643 shown and described above in reference to FIG. 6 may transmit the control search space information.

Figure 17:
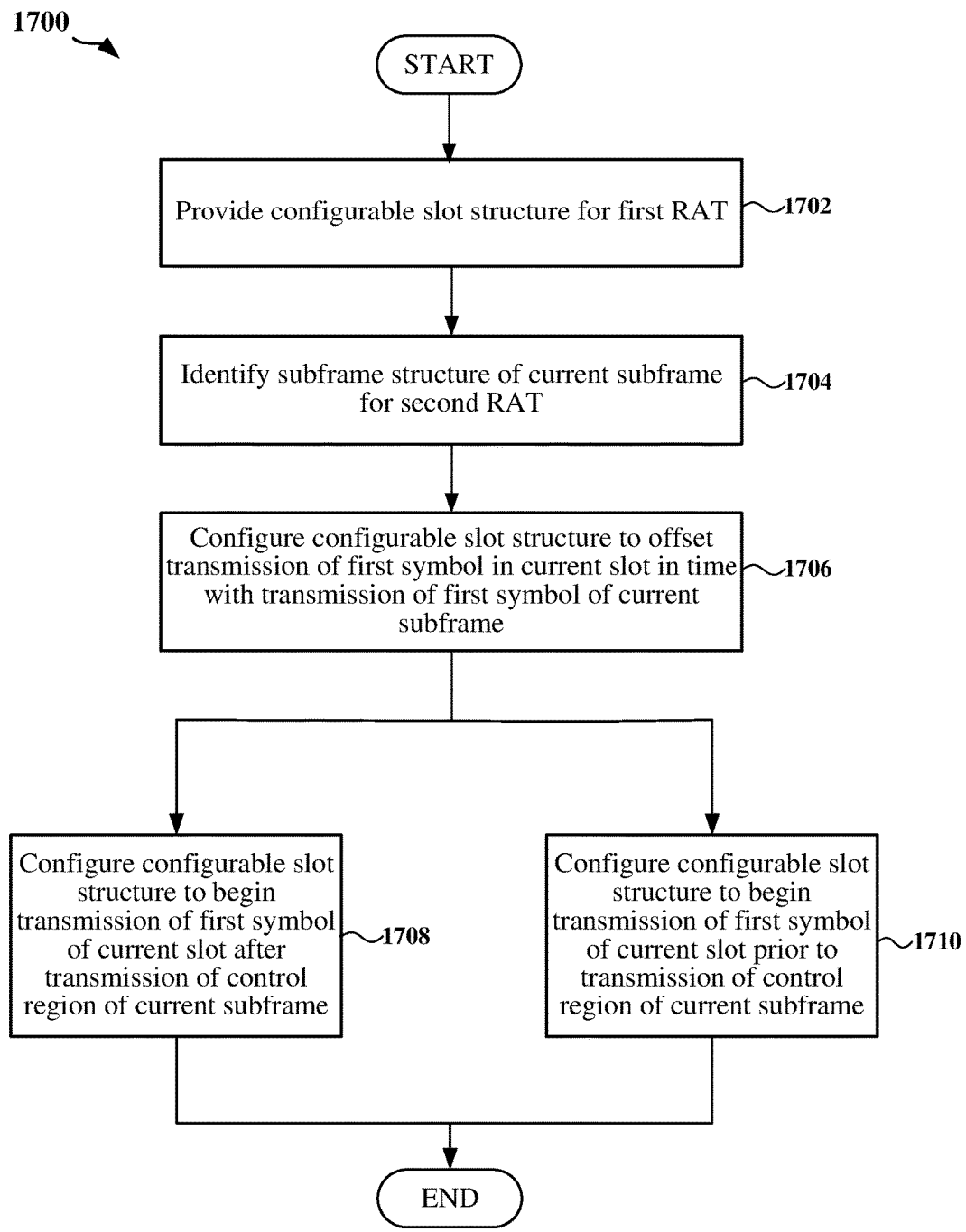
FIG. 17 is a flowchart illustrating an exemplary process for facilitating coexistence between NR and legacy transmissions utilizing a same carrier according to some aspects of the present disclosure.

FIG. 17 is a flowchart illustrating an exemplary process 1700 for facilitating coexistence between NR and legacy transmissions utilizing a same carrier according to some aspects of the present disclosure. As described below, some or all illustrated features may be omitted in a particular implementation within the scope of the present disclosure, and some illustrated features may not be required for implementation of all embodiments. In some examples, the process 1700 may be carried out by the scheduling entity illustrated in FIG. 6. In some examples, the process 1700 may be carried out by any suitable apparatus or means for carrying out the functions or algorithm described below.

At block 1702, the scheduling entity may provide a configurable slot structure for a serving cell of the scheduling entity for a first radio access technology (RAT), such as the New Radio (NR) RAT. For example, the slot structure configuration circuitry 641 shown and described above in reference to FIG. 6 may provide the configurable slot structure.

At block 1704, the scheduling entity may identify the subframe structure of a current subframe for a second RAT supported by the scheduling entity. For example, the second RAT may be a legacy RAT, such as LTE. The subframe structure may indicate the number of control symbols and the type of subframe (e.g., MBSFN subframe). For example, the slot structure configuration circuitry 641 shown and described above in reference to FIG. 6 may identify the subframe structure of the current subframe.

At block 1706, the scheduling entity may configure the configurable slot structure to offset the transmission of a first symbol of the current slot in time with the transmission of a first symbol of the current subframe. Examples of symbol offset are shown in FIGS. 9-11. For example, the slot structure configuration circuitry 641 shown and described above in reference to FIG. 6 may offset transmission of the first symbols of the current slot and the current subframe in time.

At block 1708, the scheduling entity may configure the configurable slot structure to offset the first symbol of the slot to begin transmission of the first symbol of the slot after transmission of the control region of the current subframe. In some examples, the beginning of the current slot occurs immediately after the end of the control region of the current subframe to prevent any transmissions within the current slot from occurring during the control region of the current subframe. In addition, the effective duration (and thus, the effective slot length) of current slot may be shortened to prevent next generation transmissions from occurring during the next subframe. For example, the slot structure configuration circuitry 641 shown and described above in reference to FIG. 6 may offset the first symbol of the current slot to after the control region of the current subframe.

At block 1710, instead of offsetting the first symbol of the current slot to begin after the control region of the current subframe, the scheduling entity may configure the configurable slot structure to offset the first symbol of the slot to begin transmission of the first symbol of the slot before transmission of the control region of the current subframe. In some examples, the scheduling entity may configure the configurable slot structure such that all control symbols of the current slot are transmitted prior to the control region of the current subframe. In other examples, the scheduling entity may configure the configurable slot structure to puncture the first symbol of the current subframe to transmit the last control symbol of the current slot within the duration of the first symbol of the current subframe. In either example, the scheduling entity may configure the configurable slot structure to prevent transmission of user data traffic during transmission of the control region of the current subframe. For example, the slot structure configuration circuitry 641 shown and described above in reference to FIG. 6 may offset the first symbol of the current slot to occur before the control region of the current subframe.

Figure 18:
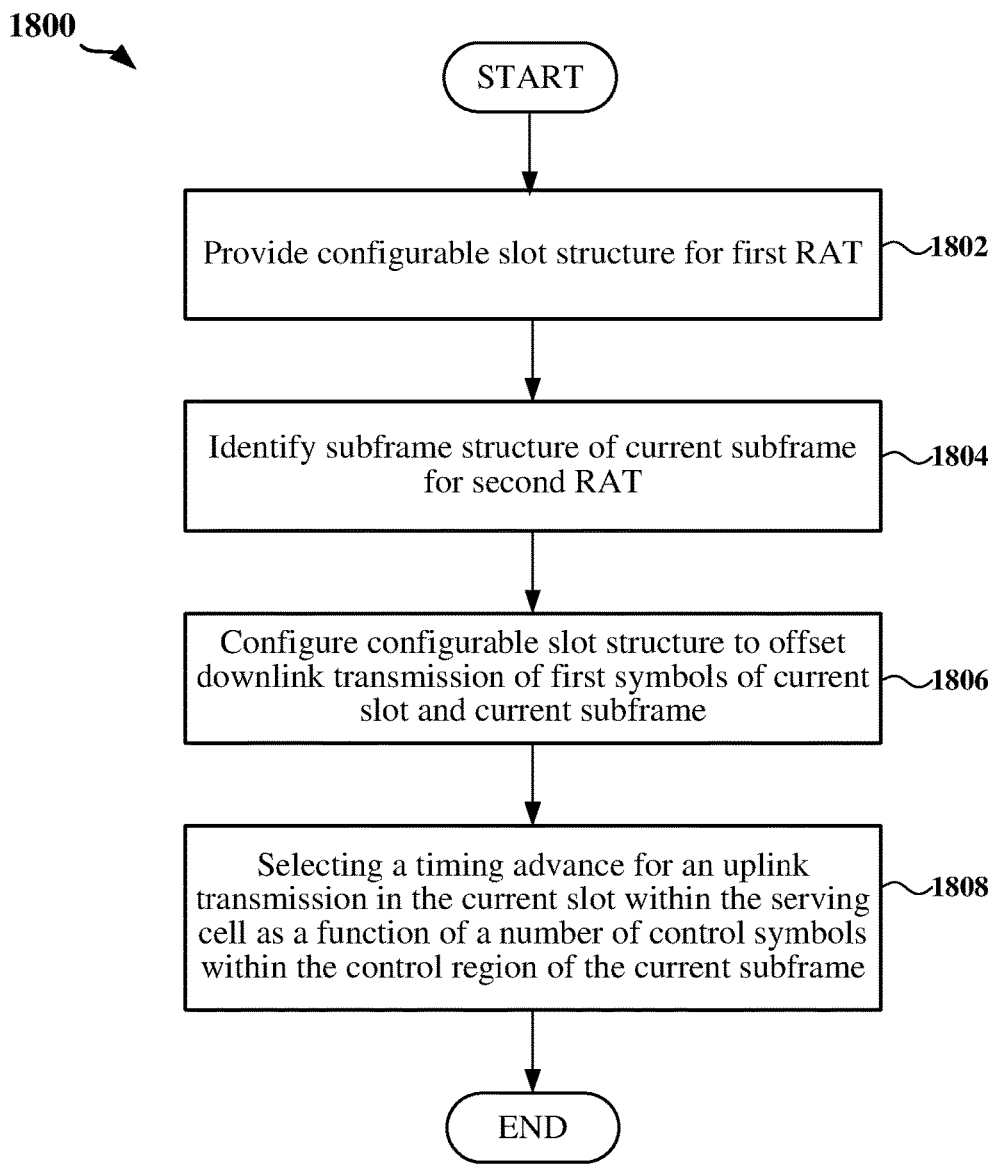
FIG. 18 is a flowchart illustrating another exemplary process for facilitating coexistence between NR and legacy transmissions utilizing a same carrier according to some aspects of the present disclosure.

FIG. 18 is a flowchart illustrating an exemplary process 1800 for facilitating coexistence between NR and legacy transmissions utilizing a same carrier according to some aspects of the present disclosure. As described below, some or all illustrated features may be omitted in a particular implementation within the scope of the present disclosure, and some illustrated features may not be required for implementation of all embodiments. In some examples, the process 1800 may be carried out by the scheduling entity illustrated in FIG. 6. In some examples, the process 1800 may be carried out by any suitable apparatus or means for carrying out the functions or algorithm described below.

At block 1802, the scheduling entity may provide a configurable slot structure for a serving cell of the scheduling entity for a first radio access technology (RAT), such as the New Radio (NR) RAT. For example, the slot structure configuration circuitry 641 shown and described above in reference to FIG. 6 may provide the configurable slot structure.

At block 1804, the scheduling entity may identify the subframe structure of a current subframe for a second RAT supported by the scheduling entity. For example, the second RAT may be a legacy RAT, such as LTE. The subframe structure may indicate the number of control symbols and the type of subframe (e.g., MBSFN subframe). For example, the slot structure configuration circuitry 641 shown and described above in reference to FIG. 6 may identify the subframe structure of the current subframe.

At block 1806, the scheduling entity may configure the configurable slot structure to offset a downlink transmission of a first symbol of the current slot in time from a downlink transmission of a first symbol of the current subframe. For example, the scheduling entity may configure the configurable slot structure to offset the first symbol of the current slot to begin transmission of the first symbol of the current slot before transmission of the control region of the current subframe. For example, the slot structure configuration circuitry 641 shown and described above in reference to FIG. 6 may offset downlink transmissions of respective first symbols of the current slot and the current subframe.

At block 1808, for UL-centric slots, the scheduling entity may select a timing advance for an uplink transmission in the current slot as a function of a number of control symbols within the control region of the current subframe. For example, the scheduling entity may determine a respective timing advance (TA) for uplink transmissions from each scheduled entity based on the respective propagation delay experienced by each scheduled entity and then modify each timing advance, if necessary, based on the number of control symbols in the current subframe to align the timing reception of uplink transmissions of the different RATs. The modified timing advance may be provided to the scheduled entities via TA commands, or the timing advance offset (e.g., offset between the actual timing advance and the modified timing advance) may be provided to the scheduled entities via explicit signaling. For example, the slot structure configuration circuitry 641 may select the timing advance.

Figure 19:
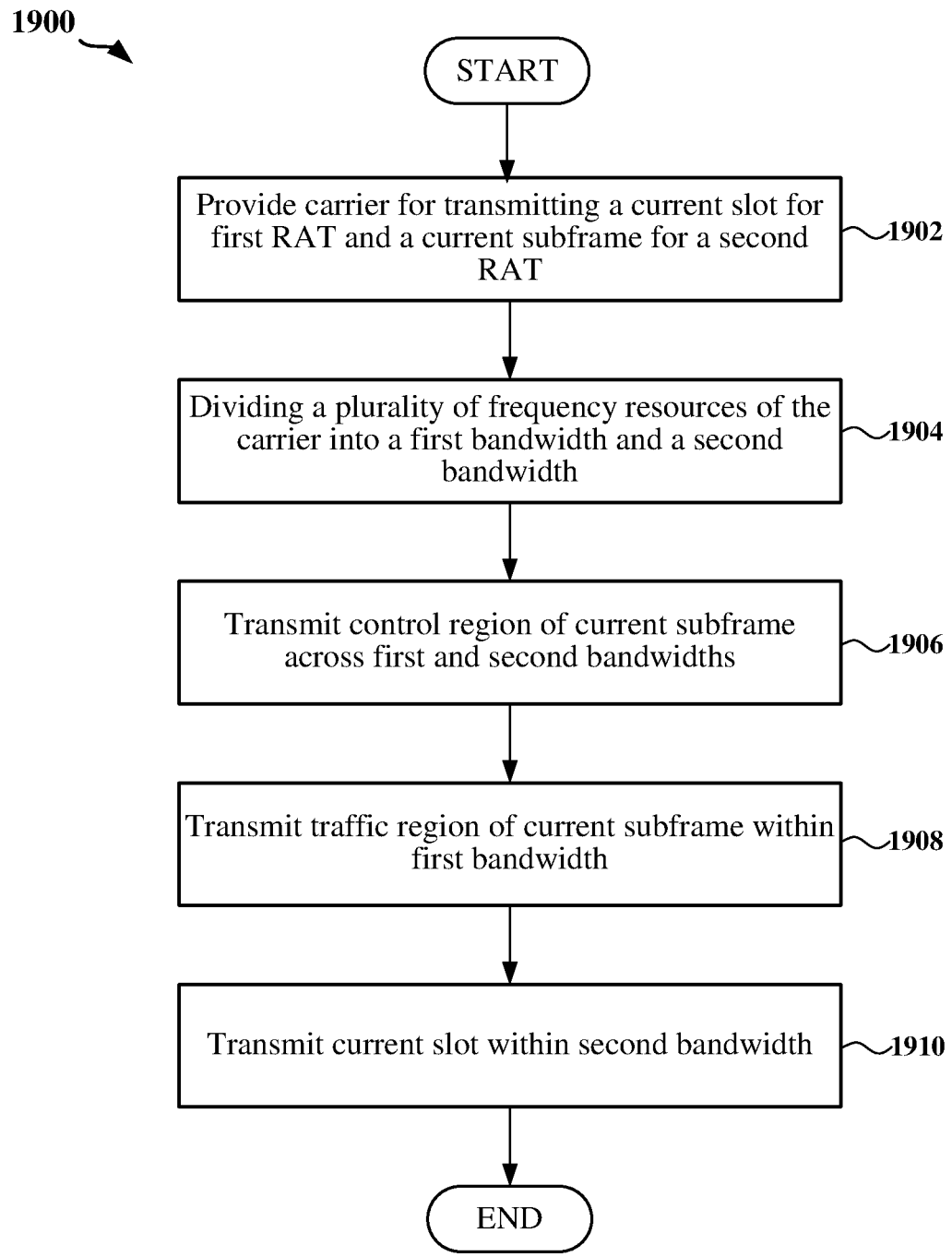
FIG. 19 is a flowchart illustrating another exemplary process for facilitating coexistence between NR and legacy transmissions utilizing a same carrier according to some aspects of the present disclosure.

FIG. 19 is a flowchart illustrating an exemplary process 1900 for facilitating coexistence between NR and legacy transmissions utilizing a same carrier according to some aspects of the present disclosure. As described below, some or all illustrated features may be omitted in a particular implementation within the scope of the present disclosure, and some illustrated features may not be required for implementation of all embodiments. In some examples, the process 1900 may be carried out by the scheduling entity illustrated in FIG. 6. In some examples, the process 1900 may be carried out by any suitable apparatus or means for carrying out the functions or algorithm described below.

At block 1902, the scheduling entity may provide a carrier for transmitting a current slot for a first RAT and a current subframe for a second RAT, where each of the first and second RATs are supported by the scheduling entity. In some examples, the first RAT is a New Radio (NR) RAT, while the second RAT is legacy RAT, such as LTE. At block 1904, the scheduling entity may divide a plurality of frequency resources of the carrier into a first bandwidth and a second bandwidth. For example, the slot structure configuration circuitry 641 shown and described above in reference to FIG. 6 may divide the carrier into two bandwidths.

At block 1906, the scheduling entity may transmit a control region of the current subframe across both the first and second bandwidths. For example, the slot structure configuration circuitry 641, the resource assignment and scheduling circuitry 642, and the DL traffic and control channel generation and transmission circuitry 643 may transmit the control region of the current subframe across the first and second bandwidths.

At block 1908, the scheduling entity may transmit a traffic region of the current subframe within the first bandwidth of the carrier. In addition, at block 1910, the scheduling entity may transmit the current slot within the second bandwidth of the carrier. In some examples, the current slot may be aligned in time with the traffic region of the current subframe. Thus, the entire current slot may be transmitted at the same time as at least a portion of the traffic region the current subframe. In some examples, the DL burst of the current slot may be transmitted within only a portion of the second bandwidth. For example, the slot structure configuration circuitry 641, the resource assignment and scheduling circuitry 642, and the DL traffic and control channel generation and transmission circuitry 643 may transmit the traffic region of the current subframe within the first bandwidth and the current slot within the second bandwidth.

In one configuration, a wireless communication device for communicating with a set of one or more scheduled entities in a serving cell of a wireless communication network utilizing a first radio access technology includes means for identifying a subframe structure of a current subframe for a second radio access technology, where the subframe structure of the current subframe comprises a control region and a traffic region. The wireless communication device further includes means for selecting an effective duration of the configurable slot structure to produce a current slot based on the subframe structure of the current subframe, where the effective duration of the current slot is selected to prevent transmission thereof during at least a portion of the control region of the current subframe. The wireless communication device further includes means for communicating between the scheduling entity and the set of one or more scheduled entities using the current slot and the current subframe, wherein the current slot and the current subframe utilize a same carrier.

In one aspect, the aforementioned means for identifying a subframe structure, and selecting an effective duration of the configurable slot structure may be the processor(s) 604 shown in FIG. 6 configured to perform the functions recited by the aforementioned means. For example, the aforementioned means may include the slot structure configuration circuitry 641 shown in FIG. 6. In another aspect, the aforementioned means for communicating may be the transceiver 610 and the processor(s) 604 shown in FIG. 6 configured to perform the functions recited by the aforementioned means. In still another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 6, and 7 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a scheduling entity to communicate with a set of one or more scheduled entities in a serving cell of a wireless communication network utilizing a first radio access technology, the method comprising:
   identifying a subframe structure of a current subframe for a second radio access technology supported by the serving cell that is different than the first radio access technology, wherein the subframe structure of the current subframe comprises a control region and a traffic region;
   selecting an effective duration of a configurable slot structure for the first radio access technology to produce a current slot based on the subframe structure of the current subframe, wherein the effective duration of the current slot is selected to prevent transmission thereof during at least a portion of the control region of the current subframe;
   communicating between the scheduling entity and the set of one or more scheduled entities using the current slot, wherein communication of the current slot occurs at least partially within the current subframe, wherein the current slot and the current subframe utilize a same carrier; and
   transmitting slot duration information comprising the effective duration of the current slot to the set of one or more scheduled entities.

2. The method of claim 1, wherein transmitting the slot duration information comprising the effective duration of the current slot to the set of one or more scheduled entities further comprises:
   transmitting subframe structure information comprising a configuration of the subframe structure of the current subframe to the set of one or more scheduled entities, wherein the subframe structure information indicates the effective duration of the current slot.

3. The method of claim 1, wherein transmitting the slot duration information comprising the effective duration of the current slot to the set of one or more scheduled entities further comprises:
   transmitting common control information comprising the effective duration of the current slot to the set of one or more scheduled entities.

4. The method of claim 3, wherein the common control information indicates whether the current slot is a shortened slot that comprises a shorter effective duration than regular slots.

5. The method of claim 1, further comprising:
   transmitting a respective configuration of a respective effective duration of each of two or more slot types to the set of one or more scheduled entities via a system information block;
   wherein each of the two or more slot types is associated with a different respective subframe structure;
   wherein the system information block is transmitted within a regular slot comprising a longer duration than the current slot.

6. The method of claim 1, wherein transmitting the slot duration information comprising the effective duration of the current slot to the set of one or more scheduled entities further comprises:
   transmitting respective control information to each scheduled entity in the set of one or more scheduled entities, wherein each of the respective control information comprises the effective duration of the current slot.

7. The method of claim 1, further comprising:
   configuring the configurable slot structure to align transmission of a first symbol of the current slot in time with transmission of a first symbol of the current subframe;

configuring the configurable slot structure to prevent transmission of control information within the current slot during transmission of at least a portion of the control region of the current subframe; and transmitting control search space information to the set of one or more scheduled entities, wherein the control search space information indicates a control search space within the current slot.

8. The method of claim 7, further comprising:

configuring the configurable slot structure to begin transmission of the control information within the current slot after transmission of the control region of the current subframe, wherein the effective duration of the current slot comprises transmission of the control information through an end of the current slot.

9. The method of claim 7, wherein transmitting the control search space information further comprises:

transmitting the control search space information to the set of one or more scheduled entities via a system information block or common control information.

10. The method of claim 9, wherein transmitting the control search space information further comprises:

transmitting the control search space information within the common control information of the current slot or the current subframe.

11. The method of claim 1, further comprising:

configuring the configurable slot structure to offset transmission of a first symbol of the current slot in time with transmission of a first symbol of the current subframe.

12. The method of claim 11, wherein configuring the configurable slot structure to offset transmission of the first symbol of the current slot in time with transmission of the first symbol of the current subframe further comprises:

configuring the configurable slot structure to begin transmission of the first symbol of the current slot after transmission of the control region of the current subframe.

13. The method of claim 11, wherein configuring the configurable slot structure to offset transmission of the first symbol of the current slot in time with transmission of the first symbol of the current subframe further comprises:

configuring the configurable slot structure to begin transmission of the first symbol of the current slot prior to transmission of the control region of the current subframe.

14. The method of claim 13, further comprising:

configuring the configurable slot structure to transmit control information within the current slot prior to transmission of the control region of the current subframe and to avoid transmission of any data within at least a portion of the control region of the current subframe; and transmitting traffic information within the control information of the current slot, wherein the traffic information indicates a starting symbol for transmission of user data traffic within the current slot.

15. The method of claim 14, further comprising:

puncturing an end of an immediately previous subframe of the second radio access technology to transmit the control information for the current slot.

16. The method of claim 15, wherein the current subframe comprises a multicast-broadcast single-frequency network (MBSFN) subframe and the immediately previous subframe comprises a non-MBSFN subframe.

17. The method of claim 11, wherein identifying the subframe structure of the current subframe further comprises:

identifying a number of control symbols of the control region of the current subframe; and configuring the configurable slot structure to offset transmission of control information within the current slot in time with transmission of the control region of the current subframe based on the number of control symbols.

18. The method of claim 17, wherein configuring the configurable slot structure to offset transmission of control information within the current slot further comprises:

configuring the configurable slot structure to offset transmission of control information within the current slot in time with transmission of the control region of the current subframe based on a fixed number of control symbols.

19. The method of claim 11, wherein a downlink transmission of the first symbol of the current slot is offset in time from a downlink transmission of the first symbol of the current subframe, and further comprising:

selecting a timing advance for an uplink transmission in the current slot within the serving cell as a function of a number of control symbols within the control region of the current subframe.

20. The method of claim 1, wherein the carrier comprises a plurality of frequency resources, and further comprising:

dividing the plurality of frequency resources into a first bandwidth for transmission of the traffic region of the current subframe and a second bandwidth for transmission of the current slot, wherein the control region of the current subframe is transmitted over all of the plurality of frequency resources.

21. The method of claim 20, further comprising:

transmitting common control information within the current slot within a portion of the second bandwidth.

22. The method of claim 1, wherein the current slot comprises a mini-slot comprising self-contained control information.

23. The method of claim 1, wherein the current subframe comprises multicast-broadcast single-frequency network (MBSFN) subframe.

24. The method of claim 1, wherein selecting the effective duration of the configurable slot structure to produce the current slot further comprises:

selecting the effective duration of the configurable slot structure to transmit the current slot during the traffic region of the current subframe when the traffic region of the current subframe is empty.

25. The method of claim 1, further comprising:

selecting a first carrier spacing for the current subframe and a second carrier spacing for the current slot, wherein the second carrier spacing is different than the first carrier spacing.

26. A scheduling entity for communicating with a set of one or more scheduled entities in a serving cell of a wireless communication network utilizing a first radio access technology, comprising:

a processor;

a transceiver communicatively coupled to the processor; and a memory communicatively coupled to the processor, wherein the processor is configured to:

identify a subframe structure of a current subframe for a second radio access technology supported by the serving cell that is different than the first radio access technology, wherein the subframe structure of the current subframe comprises a control region and a traffic region;

select an effective duration of a configurable slot structure for the first radio access technology to produce a current slot, wherein the effective duration of the current slot is selected to prevent transmission thereof during at least a portion of the control region of the current subframe;

communicate with the set of one or more scheduled entities via the transceiver using the current slot, wherein communication of the current slot occurs at least partially within the current subframe, wherein the current slot and the current subframe utilize a same carrier; and transmit slot duration information comprising the effective duration of the current slot to the set of one or more scheduled entities via the transceiver.

27. The scheduling entity of claim 26, wherein the processor is further configured to:

transmit subframe structure information comprising a configuration of the subframe structure of the current subframe to the set of one or more scheduled entities, wherein the subframe structure information indicates the effective duration of the current slot.

28. A scheduling entity for communicating with a set of one or more scheduled entities in a serving cell of a wireless communication network utilizing a first radio access technology, comprising:

means for identifying a subframe structure of a current subframe for a second radio access technology supported by the serving cell that is different than the first radio access technology, wherein the subframe structure of the current subframe comprises a control region and a traffic region;

means for selecting an effective duration of a configurable slot structure for the first radio access technology to produce a current slot based on the subframe structure of the current subframe, wherein the effective duration of the current slot is selected to prevent transmission thereof during at least a portion of the control region of the current subframe;

means for communicating with the set of one or more scheduled entities using the current slot, wherein communication of the current slot occurs at least partially within the current subframe, wherein the current slot and the current subframe utilize a same carrier; and means for transmitting slot duration information comprising the effective duration of the current slot to the set of one or more scheduled entities.

29. The scheduling entity of claim 28, wherein the means for transmitting the slot information comprising the effective duration of the current slot to the set of one or more scheduled entities further comprises:

means for transmitting subframe structure information comprising a configuration of the subframe structure of the current subframe to the set of one or more scheduled entities, wherein the subframe structure information indicates the effective duration of the current slot.

30. A non-transitory computer-readable medium storing computer executable code, which when executed by a processor, causes a scheduling entity in a wireless communication network to:

provide a configurable slot structure for a serving cell for a first radio access technology, wherein the serving cell further supports a second radio access technology different than the first radio access technology;

identify a subframe structure of a current subframe for the second radio access technology, wherein the subframe structure of the current subframe comprises a control region and a traffic region;

select an effective duration of the configurable slot structure to produce a current slot based on the subframe structure of the current subframe, wherein the effective duration of the current slot is selected to prevent transmission thereof during at least a portion of the control region of the current subframe;

communicate between a scheduling entity and a set of one or more scheduled entities using the current slot, wherein communication of the current slot occurs at least partially within the current subframe, wherein the current slot and the current subframe utilize a same carrier; and transmit slot duration information comprising the effective duration of the current slot to the set of one or more scheduled entities.

* * * * *